United States Patent
Imai

(10) Patent No.: US 7,694,333 B2
(45) Date of Patent: Apr. 6, 2010

(54) COMMUNICATION APPARATUS, COMMUNICATION SYSTEM, CERTIFICATE TRANSMISSION METHOD, ANOMALY DETECTION METHOD AND A PROGRAM THEREFOR

(75) Inventor: Tatsuya Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1368 days.

(21) Appl. No.: 10/896,900

(22) Filed: Jul. 23, 2004

(65) Prior Publication Data

US 2007/0198830 A1 Aug. 23, 2007

(30) Foreign Application Priority Data

| Jul. 25, 2003 | (JP) | ............................ 2003-201638 |
|---|---|---|
| Jul. 25, 2003 | (JP) | ............................ 2003-201644 |
| Jul. 5, 2004 | (JP) | ............................ 2004-198624 |
| Jul. 5, 2004 | (JP) | ............................ 2004-198627 |

(51) Int. Cl.
- G06F 7/04 (2006.01)
- G06F 15/16 (2006.01)
- G06F 17/30 (2006.01)
- H04L 29/06 (2006.01)
- H04L 9/32 (2006.01)

(52) U.S. Cl. .................. 726/10; 713/156; 713/172; 713/175

(58) Field of Classification Search .............. 713/156, 713/157, 168, 169, 172, 173, 175, 176; 726/9, 726/10

See application file for complete search history.

(56) References Cited

U.S. PATENT DOCUMENTS 6,564,320 B1 * 5/2003 de Silva et al. ............. 713/156

| 2001/0034833 A1 | 10/2001 | Yagasaki et al. |
|---|---|---|
| 2002/0026581 A1 | 2/2002 | Matsuyama et al. |
| 2002/0078346 A1 | 6/2002 | Sandhu et al. |
| 2003/0051134 A1* | 3/2003 | Gupta ...................... 713/156 |
| 2003/0172308 A1 | 9/2003 | Imai |
| 2003/0223766 A1 | 12/2003 | Imai |
| 2004/0139188 A1 | 7/2004 | Imai |

FOREIGN PATENT DOCUMENTS

| JP | 2002-251492 | 9/2002 |
|---|---|---|
| JP | 2002-353959 | 12/2002 |

OTHER PUBLICATIONS

"Internet X.509 Certificate Request Message Format," Request For Comments (RFC) 2511, Myers et al., Network Working Group, Mar. 1999.*

* cited by examiner

Primary Examiner—Nasser G Moazzami
Assistant Examiner—Oscar A Louie
(74) Attorney, Agent, or Firm—Oblon, Spivak, McClelland, Maier & Neustadt, L.L.P.

(57) ABSTRACT

A communication apparatus has a communication part and authenticates a communication partner by using a digital certificate, wherein the communication apparatus includes an authentication part carrying out authentication of the communication partner by using a common certificate, the common certificate being a digital certificate not including identification information of an apparatus, and an individualized certificate transmission part acquiring, in the case the authentication by the authentication part has been made successfully, individualized certificate and transmitting the individualized certificate to said communication partner, the individualized certificate being a digital certificate including identification information of the communication partner.

18 Claims, 21 Drawing Sheets

FIG.4

| | ACQUIRE STATUS | ACQUIRE LOG | UPDATE CERTIFICATE | EXECUTE COMMAND |
|---|---|---|---|---|
| COMMON CERTIFICATE | × | × | ○ | × |
| INDIVIDUALIZED CERTIFICATE | ○ | ○ | ○ | ○ |

FIG.9

CERTIFICATE SET

INDIV PUB KEY CERTIF
FOR SUB APPRTUS

INDIV PRIV KEY
FOR SUB APPRTUS

INDIV ROOT KEY CERTIF FOR
SUPERORD APPRTUS AUTH

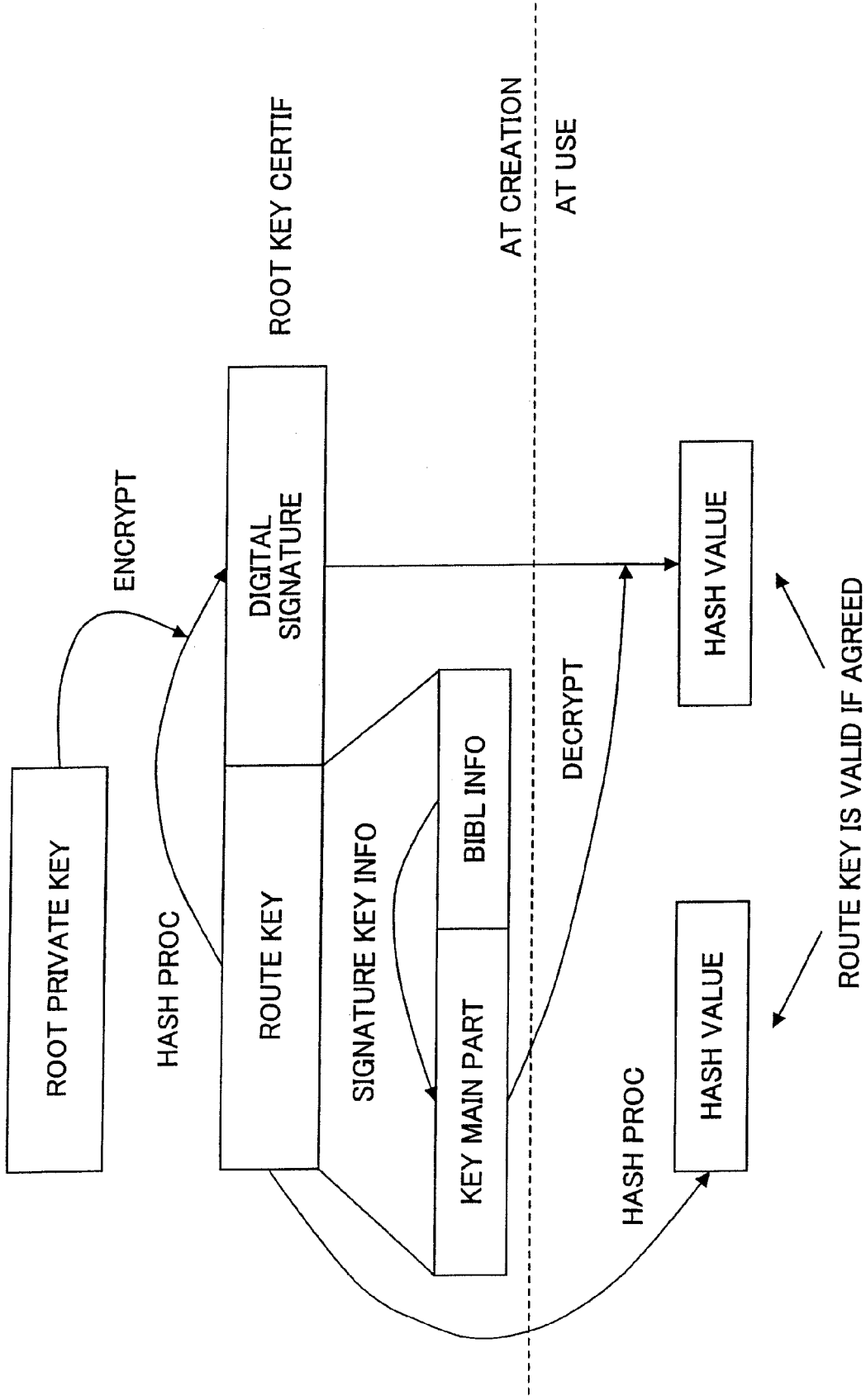

1

COMMUNICATION APPARATUS, COMMUNICATION SYSTEM, CERTIFICATE TRANSMISSION METHOD, ANOMALY DETECTION METHOD AND A PROGRAM THEREFOR

CROSS REFERENCE TO RELATED APPLICATIONS

The present application is based on Japanese priority applications No. 2003-201638 and No. 2003-201644 both filed on Jul. 25, 2003, and No. 2004-198624 and No. 2004-198627 both filed on Jul. 5, 2004, the entire contents of which are hereby incorporated by reference.

BACKGROUND OF THE INVENTION

The present invention relates to a communication apparatus having communication means and authenticating a communication partner at the time of communication by using a digital certificate, a communication apparatus used for a communication partner, a communication system formed of a superordinate apparatus and a subordinate apparatus provided by such a communication apparatus, a certificate transmission method transmitting a digital certificate used for authentication in such a communicating apparatus or communication system, to a communication partner, an anomaly detection method detecting anomaly of authentication in such a communication apparatus or communication system, and a program for configuring a computer to function as the aforementioned communication apparatus.

Conventionally, it is practiced to construct various systems by connecting plural communication apparatuses each having the function of communication with each other via a network such that the communication apparatuses can communicate with each other across the network. One example of such a system is the electronic commerce system, in which the order of a product is transmitted from a computer such as a PC functioning as a client to a server connected to the Internet. Further, there is a proposal of the system in which various electronic apparatuses are connected with each other via a network by providing thereto the function of client or server, so that remote control of the electronic apparatuses becomes possible.

In such a system, it is important to confirm whether or not the partner of the communication is a valid or appropriate communication partner, or the information transmitted from the communication partner is not falsified. In the case of using the Internet, in which the information is passed to the communication partner by irrelevant computers, it is also necessary to protect the information, particularly classified information, from wiretapping.

In order to meet for such a demand, the communication protocol such as SSL (Secure Socket Layer) is proposed and used extensively.

By using this protocol at the time of communication, authentication of the communication partner is achieved by combining the public key cryptosystem and the common key cryptosystem, and falsification or wiretapping is prevented as a result of encryption of the information. Further, the communication partner can also authenticate the apparatus that is transmitting the communication thereto.

With regard to the technology related to authentication that uses SSL or public key cryptosystem, reference should be made to Reference 1 and Reference 2 below.

Hereinafter, the communication procedure employed at the time of mutual authentication according to SSL will be explained particularly with regard to the part of the authentication processing.

FIG. 19 is a flowchart showing the processing executed at the time of mutual authentication between a communication apparatus A and a communication apparatus B according to SSL, together with the information used for the processing, wherein FIG. 19 shows the processing for each of the communication apparatus A and the communication apparatus B.

As shown in FIG. 19, it is necessary for the mutual authentication conducted according to SSL to store the root key certificate and also the private key and the public key certificate in each of the communication apparatuses.

Here, it should be noted that this private key is a key issued by a CA (certificate authority) for each of the apparatuses, while the public key certificate is a digital certificate issued by the CA for the public key corresponding to that private key together with a digital signature. Further, the root key certificate is a digital certificate issued by the CA with digital signature for the root key corresponding to the route private key used by the CA for the digital signature.

FIGS. 20A and 20B show the relationship of the foregoing.

As shown in FIG. 20A, the public key A is formed of a key main part used for decrypting the documents encrypted by the private Key A and bibliographical information that includes the information about the issuer (CA) of the public key, the term of validity of the public key, and the like.

In order to demonstrate that the key main part or the bibliographic information of the public key A is not falsified, the CA encrypts the hash value obtained by hash processing of the public key A by using the route public key and produces a digital signature, which is attached to the client public key. Further, the identification information of the route private key used for the digital signature is added to the bibliographic information of the public key A as the signature key information. This pubic key certificate attached with the digital signature is used for the public key certificate A.

In the case of using the public key certificate A in the authentication processing, the digital signature included therein is decrypted by using the key main part of the root key, which is the public key corresponding to the route private key. Thus, when the decryption is carried out successfully, it means that the digital signature is duly attached by the CA. Further, in the case the hash value obtained by the hash processing of the part of the public key A agrees with the hash value obtained by the decryption, this means that there has been no damaging or falsification also in the key itself. Further, when the received data is successfully decrypted by using the public key A, this means that the data is duly transmitted from the owner of the private key A.

In order to carry out the authentication processing, it is necessary to store the root key in advance, wherein this root key is stored in the form of root key certificate in which a digital signature is attached by the CA as shown in FIG. 20B. This root key certificate has the self-signature form in which the digital signature can be decrypted by the public key contained itself. Thus, in the case of using the root key, the digital signature is decrypted by using the key main part included in the root key certificate, and the decrypted digital signature is compared with the hash value obtained by the hash processing of the root key. When these two agree with each other, it is confirmed that the root key is not damaged.

Next, the flowchart of FIG. 19 will be explained, wherein it should be noted that the arrows connecting the two flowcharts represent transfer of data. Thereby, the transmission side carries out the transfer processing in the steps at the root part of the arrow, while the reception side carries out the processing steps at the head part of the arrow upon reception of that information.

In the event the processing of any of the steps has not completed successfully, there is produced a response indicative of failure of authentication and the processing is interrupted. The same applies also in the case the partner has returned the response of failed authentication or there occurs timeout in the processing.

In the explanation hereinafter, it is assumed that the communication apparatus A requests communication to the communication apparatus B.

In this case, the CPU of the communication apparatus A starts the processing of the flowchart shown at the left of FIG. 19 by executing a predetermined control program and transmits a connection request to the communication apparatus B in the step S11.

Upon reception of the connection request, the CPU of the communication apparatus B starts the processing of the flowchart at the right of FIG. 19 by executing a predetermined control program. Further, a first random number is created in the step 21 and the first random number thus created is encrypted by using the private key B.

Next, in the step S22, the first random number thus encrypted is transmitted to the communication apparatus A together with the public key certificate B.

In the side of the communication apparatus A, the step S12 is carried out upon reception of the same and the validity of the public key certificate B is examined by using the root key certificate.

Upon confirmation, the first random number is decrypted by using the public key B included in the public key certificate B thus received. When the decoding has been made successfully, it is confirmed that the first random number is the one duly received from the issue source of the public key certificate B.

Thereafter, in the step S14, a second random number and a seed of a common key are created separately to the step S13, wherein the seed of the common key can be created based on the data exchanged so far in the past communication.

Next, in the step S15, the second random number is encrypted by using the private key A, and the seed of the common key is encrypted by using the public key B. Further, in the step S16, these (encrypted second random number and the seed of common key) are transmitted to the server together with the public key certificate A. It should be noted that the encrypting of the seed of the common key is made in such a manner that the seed of the common key is not known to other apparatuses than the communication partner.

Next, in the step S17, a common key used thereafter for encryption of the communication is created from the seed of the common key, which has been created in the step S14.

In the side of the communication apparatus B, the validity of the public key certificate A is examined in the step S23 by using the root key certificate upon reception of the data transmitted from the communication apparatus A in the step S16.

Upon confirmation, the second random number is decrypted in the step S24 by using the public key A included in the received public key certificate A. When the decryption is made successfully, it is confirmed that the second random number is duly received from the issue source of the public key certificate A.

Thereafter, the seed of the common key is decrypted in the step S25 by using the private key B.

With this, the seed of the common key is shared between the communication apparatus A and the communication apparatus B. Thereby, it should be noted that no other apparatuses than the foregoing communication apparatus A, in which the seed is created, and the communication apparatus B having the private key B, can know this seed of the common key.

When the processing up to here has been successfully achieved, the communication apparatus B also creates, in the step S26, the common key to be used for encryption in the communication thereafter, from the seed of the common key thus decrypted.

Upon completion of the processing of the step S17 in the side of the communication apparatus A and the completion of the step S26 in the side of the communication apparatus B, confirmation is made with regard to the mutual success of authentication and with regard to the encryption process to be used in the communication thereafter. Thereby, agreement is made between the communication apparatuses A and B that the communication thereafter will be made by the foregoing encryption process while using the common key thus created. With this, the processing of authentication is completed. Here it is assumed that this confirmation includes also the response from the communication apparatus B indicating that the authentication is made successfully.

With this, communication is established between the communication apparatuses A and B, and it becomes possible to make encrypted communication of data thereafter, according to the common key cryptosystem while using the common key created in the step S17 or S26.

By carrying out such processing, it becomes possible for the communication apparatus A and the communication apparatus B to exchange the common key safely, and a safe route of communication is established.

In the foregoing processing, it should be noted that it is not mandatory to encrypt the second random number by the private key A and transmit the public key certificate A to the communication apparatus B.

In this case, the steps S23 and S24 in the side of the communication apparatus B can be omitted and the processing becomes the one shown in FIG. 21.

Although such a process does not allow the communication apparatus B to authenticate the communication apparatus A, such a process will nevertheless be sufficient in the case authentication of the communication apparatus B by the communication apparatus A is sufficient. Further, in such a case, memorizing the root key certificate to the communication apparatus A is sufficient, and there is no need of memorizing the private key A and the public key certificate A. Further, there is no need of memorizing the root key certificate.

Meanwhile, in such authentication process, there can be two levels of authentication. The first level judges whether or not the apparatus of the communication partner is the one that satisfies a predetermined standard. For example, judgment is made in the first level as to whether or not the apparatus of the communication partner is the one supplied from the same vendor or whether or not the apparatus of the communication partner is the one passed a predetermined test. The second level identifies the apparatus of the communication partner individually.

In the case of carrying out the first level authentication, a set of public key certificate and private key is stored commonly to the equipments satisfying a predetermined standard and authentication is carried out at the time of the SSL communication by confirming that the partner of the communication is duly the apparatus that is subjected to the public key certificate. Thus, there is no need of exchanging the identification information (ID) pertinent to the apparatuses.

In the case of the second level authentication, it is possible to carry out the authentication by establishing a safe communication route by using the key similar to the one used in the case of the first level authentication and causing the partner of communication to transmit the ID for identification of the partner. Thereby, the authentication is achieved by using this ID.

SUMMARY OF THE INVENTION

On the other hand, with such authentication procedure, leakage of the common public key certificate and the private key may allow a third party for false personation of any of the apparatuses that understand the ID. Thereby, the safety of communication is degraded severely. Further, the safety of communication cannot be restored unless the key is updated for all of the equipments, while such a procedure requires a very large work load.

In order to solve this problem, it is conceivable to issue a public key certificate and a private key for each of the equipments and describe the ID of the apparatus in the bibliographic information of the public key certificate, such that it becomes possible to confirm whether or not the communication partner that has transmitted a certificate is a valid communication partner (the apparatus subjected to the certificate) by referring to the ID included in the bibliographic information at the time of confirming the validity of the public key certificate.

By doing so, the pair of the public key certificate and the private key becomes different between the apparatuses, and thus, the leakage of key with regard to one particular apparatus can merely allow false personalization for only that apparatus. Further, safety of the communication can be restored by merely updating the key for that apparatus.

However, such a procedure still leaves problems at the time of restoring operation in the case the key has become unusable as a result of damaging or the like. Normal authentication according to SSL is not possible in such a case, and it is not possible to secure a safe communication route for the communication apparatus subjected to the restoration.

Thus, in order to distribute a new key safely, it is necessary to deliver a medium recorded with the new key to the site of the apparatus by using a postal service. In addition, such updating has to be carried out manually by a human operator, while this means that there has to be an expert having sufficient skill at the site of the apparatus subjected to the updating, for carrying out the necessary updating work. Further, such updating by human operator raises the problems of long working time for restoration operation and low reliability of updating work in view of the possibility that a human operator may neglect the necessary updating.

Further, such an approach raises additional problem, in view of the fact that the ID of the apparatus is described in the new public key certificate, in that the ID used for identification of the apparatus or user may be changed also a the time of the restoration. This means that it is not possible to prepare a recording medium recorded with the new public key certificate in advance and that the recording medium has to be made according to the needs, after the apparatus that needs the updating has been identified. Thus, there has been a problem that such preparation of the recording medium suffers from very low productivity.

The present invention has its object of easy restoration, in a communication apparatus that authenticates a communication partner at the time of communication by using a digital certificate or a communication system that uses such a communication apparatus, of the state of normal authentication in the event there has been anomaly in the authentication, while maintaining security.

With regard to the aforementioned approach of the related art of issuing the public key certificate and the private key for each of the apparatuses and describing the apparatus ID in the bibliographic information of the public key certificate, there still remain further problems, even when it has been confirmed that the partner (the apparatus subjected to the certificate) that has transmitted the certificate is a valid communication partner by referring to the ID included in the bibliographic information during the confirmation of validity of the public key certificate, with regard to the procedures to be taken in the case the authentication has been failed.

The authentication fails naturally when the partner of the communication is an invalid apparatus and thus not having the appropriate key or certificate. In addition to this, there can be a case in which the authentication fails even when the communication partner is a valid apparatus for communication when the key or certificate has become unusable as a result of damaging.

When the latter situation occurs, it is necessary to restore the key or certificate immediately such that normal authentication is recovered. However, it is not possible to distinguish whether the failure of authentication has been caused because the partner of the communication is an invalid apparatus not having the key or certificate or the key or the certificate has been lost as a result of damaging. Because of this, it has been difficult to carry out automatic restoration process selectively in the latter case.

Thus, rectification of the problem has been made in the related art only upon inquiry of the user of the apparatus in which the authentication has been failed or when an apparatus not communicating for long time has been discovered. Thus, there has been a problem that anomaly of authentication caused by damaging of the certificate or the like cannot be recognized promptly and that this state of defective authentication is left unattended for long time.

The object of the present invention is to provide a communication apparatus authenticating a communication partner at the time of communication by using a digital certificate or a communication system that uses such a communication apparatus, wherein occurrence of anomaly in the authentication, which is achieved by using a digital certificate including therein identification information of the apparatus, is recognized easily and promptly.

Another object of the present invention is to provide a communication apparatus having communication means and authenticating a communication partner at the time of communication by using a digital certificate, comprising: authentication means for authenticating said communication partner by using a common certificate, said common certificate being a digital certificate not including identification information of an apparatus; and individual certificate transmission means for acquiring an individual certificate, which is a digital certificate including identification information of said communication partner, said individual certificate transmission means further transmitting said individual certificate to said communication partner.

In such a communication apparatus, authentication is first made, when communicating with said communication partner, by using said individual certificate, wherein said authentication means carries out, in the event said authentication is not carried out properly, authentication of said communication partner by using said common certificate.

Another object of the present invention is to provide a communication apparatus capable of communicating with any of said communication apparatuses note above, comprising:

certificate memory means for memorizing an individualized certificate, which is a digital certificate including identification information of an apparatus, and a common certificate, which is a digital certificate not including identification information of an apparatus; and means for receiving from said communication partner an individualized certificate attached with identification information of said communication partner and memorizing the same in said certificate memory means.

In any of said communication apparatuses, it is preferable that said authentication is carried out according to protocol of any of SSL or TLS and use said individualized certificate as a public key certificate of said communication apparatus identified by said identification information.

Another object of the present invention is to provide a communication apparatus comprising a superordinate apparatus and a subordinate apparatus having respective communication means, said superordinate apparatus authenticating said subordinate apparatus at the time of communication by using a digital certificate, said subordinate apparatus comprising certificate memory means memorizing an individualized certificate, which is a digital certificate including identification information of said subordinate apparatus, and a common certificate, which is a digital certificate not including identification information of said apparatus, said superordinate apparatus comprising:

authentication means for authenticating said subordinate apparatus by using said common certificate; and individualized certificate transmission means for acquiring, upon success of authentication of said authentication means, a new individualized certificate of said subordinate apparatus, said individualized certificate transmission means transmitting said new individualized certificate to said subordinate apparatus.

In such a communication system, it is preferable that the superordinate apparatus carries out authentication first, when the superordinate apparatus is going to communicate with said subordinate apparatus, by using the individualized certificate, and use the foregoing authentication means for the authentication, in the event the foregoing authentication could not be achieved properly, by using the foregoing common certificate.

Further, it is preferable to use the common certificate only for the case of memorizing a new individualized certificate in the foregoing subordinate apparatus.

Further, it is preferable to provide the foregoing subordinate apparatus in plural numbers and store the same common certificate in the certificate memory means of all of the foregoing subordinate apparatuses.

In such a communication system, it is preferable to carry out the foregoing authentication according to a protocol of SSL or TLS and use the individualized certificate and the public key certificate of the foregoing subordinate apparatus.

Another object of the present invention is to provide a certificate transmission method transmitting a digital certificate in a communication apparatus, said communication apparatus having communication means and authenticating a communication partner at the time of communication by using said digital certificate, comprising the steps of:

authenticating said communication partner by using a common certificate, which is a digital certificate not attached with identification information of an apparatus; and acquiring, upon success of said authentication, an individualized certificate, which is a digital certificate attached with identification information of said communication partner, and transmitting said individualized certification to said communication partner.

In such a certificate transmission method, it is preferable to carry out, when communicating with said communication partner, authentication at first by using said individualized certificate, and carry out authentication, in the event said authentication has failed, by using said common certificate.

Further, it is preferable that the foregoing authentication is carried out by an authentication processing according to a protocol of SSL or TLS and use the individualized certificate as the public key certificate of the communication apparatus indicated by the identification information.

Another object of the present invention is to provide a certificate transmission method transmitting a digital certificate in a communication system comprising a superordinate apparatus and a subordinate apparatus respectively having communication means, said superordinate apparatus authenticating said subordinate apparatus at the time of communication by using said digital certificate, comprising the steps of:

memorizing in said subordinate apparatus an individualized certificate, which is a digital certificate including identification information of said subordinate apparatus, and a common certificate, which is a digital certificate not including said identification information of said subordinate apparatus; and acquiring a new individualized certificate of said subordinate apparatus upon success of said authentication and transmitting said new individualized certificate to said subordinate apparatus.

In such a certificate transmission method, it is preferable that said superordinate apparatus first carries out authentication, when communicating with said subordinate apparatus, by using said individualized certificate, and carries out, in the event said authentication has failed, authentication by using said common certificate.

Further, it is preferable that said common certificate is used only when memorizing said new individualized certificate in said subordinate apparatus.

Further, it is preferable to hold, in the event said subordinate apparatus is provided in plural numbers, said common certificate in the certificate memory means of all of said subordinate apparatuses.

Further, it is preferable that said authentication is carried out by authentication processing according to a protocol of SSL or TLS while using said individualized certificate as a public key certificate of said subordinate apparatus.

Another object of the present invention is to provide a program for configuring a computer as a communication apparatus having communication means and authenticating a communication partner by using a digital certificate, such that said computer comprises:

authentication means for authenticating said communication partner by using a common certificate, which is a digital certificate not having identification information of an apparatus; and individualized certificate transmission means for acquiring, upon success of authentication by said authentication means, an individualized certificate, which is a digital certificate including identification information of said communication partner, said individualized certificate transmission means further transmitting said individualized certificate to said communication partner.

In the present invention, it is preferable to include a program that causes said computer to carry out said authentication by using said individualized certificate when communicating with said communication partner and use said authentication means, in the event said authentication has failed, for the means of authentication that uses said common certificate.

Another object of the present invention is to provide a program for configuring a computer to function as a communication apparatus communicable with a communication partner, such that said computer comprises:

certificate memory means memorizing an individual certificate, which is a digital certificate including identification information of an apparatus, and a common certificate, which is a digital certificate not including said identification information of said apparatus; and means fore receiving an individualized information from said communication partner such that said individualized information includes identification information of said communication apparatus.

In each of these programs, it is preferable that the foregoing authentication is carried out according to a protocol of SSL or TLS and use the foregoing individualized certificate as the public key certificate of the apparatus shown in the identification information.

According to the communication apparatus, communication system or certificate transmission method of the present invention, in which authenticates of a communication partner is achieved at the time of communication by using a digital certificate, to restore the state of normal authentication in the event there has been anomaly of authentication, while maintaining security.

Further, according to the program of the present invention, it is possible to realize the foregoing functions of the communication apparatus by using a computer, by configuring the computer by the program.

Still another object of the present invention is to provide a communication apparatus having communication means and authenticating a communication partner at the time of communication by using a digital certificate, comprising:

first authentication means for carrying out authenticating by using an individualized certificate, which is a digital certificate including identification information of an apparatus, when communicating with said communicating partner;

second authentication means for carrying out, when said authentication by said means is not carried out properly, authentication by using a common certificate, which is a digital certificate not including identification information of an apparatus; and anomaly detection means for detecting, when said authentication by said second authentication means has been made successfully, existence of anomaly in said authentication that has been conducted by using said individualized certificate.

Another object of the present invention is to provide a communication apparatus communicating with aforementioned communicating apparatus as said communication partner, said communication apparatus forming said communication partner including certificate memory means, said certificate memory means storing individualized certificate, which is a digital certificate including identification information of an apparatus, and a common certificate, which is a digital certificate not including identification information of an apparatus.

In any of the foregoing communication apparatuses, it is preferable to carry out the foregoing authentication by an authentication procedure according a protocol of SSL or TLS and use the individualized certificate as the public key certificate of the communication apparatus indicted by the identification information.

Another object of the present invention is to provide a communication system comprising a superordinate apparatus and a subordinate apparatus having respective communication means, said superordinate apparatus authenticating said subordinate apparatus a the time of communication by using a digital certificate, wherein said subordinate apparatus comprises certificate memory means for memorizing an individualized certificate, which is a digital certificate including identification information of said subordinate apparatus, and a common certificate, which is a digital certificate not including identification information of an apparatus, and wherein said superordinate apparatus comprises:

first certification means carrying out authentication by using said individualized certificate when communicating with said subordinate apparatus;

second authentication means carrying out authentication, in the event authentication by said first authentication means has failed, by using said common certificate; and anomaly detection means detecting anomaly in the event authentication by said second authentication means has made successfully.

In such a communication system, it is preferable to provide said subordinate apparatus in plural numbers and hold said common certificate in said certificate storage means in all said subordinate apparatuses.

It is preferable that said authentication is carried out according to a protocol of SSL or TLS and use said individualized certificate as a public key certificate of said subordinate apparatus.

Another object of the present invention is to provide an anomaly detection method for detecting anomaly of authentication in a communication apparatus that comprises communication means and authenticates a communication partner at the time of communication by using a digital certificate, comprising:

a first authentication step for carrying out authentication, when communicating with said communication partner, by using an individualized certificate, which is a digital certificate including identification information of an apparatus;

a second authentication step for carrying out authentication, in the event authentication in said first authentication step has failed, by using a common certificate, which is a digital certificate not including identification information of an apparatus; and anomaly detection step detecting anomaly in said authentication conducted by using said individualized certificate in the event said authentication of said second authentication step has been successful.

In such anomaly detection method, it is preferable to carry out said authentication according to a protocol of SSL or TLS and use said individualized certificate as a public key certificate of the communication apparatus indicated by said identification information.

Another object of the present invention is to provide an anomaly detection method in a communication system comprising a superordinate apparatus and a subordinate apparatus having respective communication means, said superordinate apparatus authenticating said subordinate apparatus by using a digital certificate, comprising:

memorizing an individualized certificate, which is a digital certificate including identification information of said subordinate apparatus, and a common certificate, which is a digital certificate not including said identification information of subordinate apparatus, in said subordinate apparatus;

causing said superordinate apparatus to carry out a first authentication step, when said superordinate apparatus communicates with said subordinate apparatus, by using said individualized certificate;

causing said superordinate apparatus to carry out a second authentication step when said first authentication step has failed by using said common certificate; and detecting anomaly in said first authentication step that uses said individualized certificate when said second authentication step has made successfully.

In such anomaly detection method, it is preferable, when the subordinate apparatus is provided with plural numbers, to store the same common certificate in the certificate memory means in all the subordinate apparatuses.

Further, it is preferable to carry out the foregoing authentication according to a protocol of SSL or TLS and use the individualized certificate as the public key certificate of the subordinate apparatus.

Another object of the present invention is to provide a program for configuring a computer to function as a communication apparatus such that said communication apparatus has communication means and authenticates a communication partner at the time of communication by using a digital certificate, said program configuring said computer such that said communication apparatus comprises:

first authentication means for carrying out authentication when communicating with a communication partner by using an individualized certificate, which is a digital certificate including identification information of an apparatus; and second authentication means for carrying out authentication when authentication by said first authentication means has failed by using a common certificate, which is a digital certificate not including identification information of an apparatus, said communication apparatus detecting anomaly in authentication conducted by said first authentication means when authentication by said second authentication has made successfully.

Another object of the present invention is to provide a program for configuring a computer such that said computer functions as a communication apparatus capable of communicating with a communication apparatus noted above and having a certificate memory memorizing an individualized certificate, which is a digital certificate including identification information of an apparatus, and a common certificate not including identification information of an apparatus.

In the program noted above, it is preferable to carry out the authentication according to a protocol of SSL or TLS and use the individualized certificate as the public key certificate of the apparatus indicated by the identification information.

According to the communication apparatus, communication system or anomaly detection method of the present invention, it becomes possible, in the communication apparatus that carries out authentication at the time of communication by using a digital certificate, to detect anomaly in the authentication conducted by using a digital certificate that includes the identification information of the apparatus easily and promptly. Further, according to the program of the present invention, it becomes possible to configure a computer to function as the foregoing communication apparatus. Thereby, the similar effect of the present invention is achieved.

BRIEF DESCRIPTION OF THE DRAWINGS

FIG. 4 is a diagram for explaining the standard of judgment used when deciding whether or not to permit a request in a request managing part of the subordinate apparatus shown in FIGS. 1 and 2;

FIG. 9 is a diagram showing an example of the certificate set transmitted in the communication system of FIGS. 1 and 2 from the superordinate apparatus to the subordinate apparatus at the time of updating of the regular authentication information of the subordinate apparatus;

FIGS. 20A and 20B are diagrams explaining the relationship between the root key, route private key and the public key certificate in the authentication processing shown in FIG. 19.

DETAILED DESCRIPTION OF THE INVENTION

Hereinafter, preferred embodiments of the present invention will be explained with reference to the drawings.

First, explanation will be made about the communication apparatus of the present invention and also the communication system according to the first embodiment of the present invention that uses the foregoing communication apparatus.

In this embodiment, a communication system is constructed by a superordinate apparatus 30 and a subordinate apparatus 40, both being a communication apparatus, wherein the superordinate apparatus 30 is connected to a certificate managing apparatus 20 via a network in a manner that communication therebetween is possible. Thereby, the communication system and the certificate managing apparatus form a digital certificate managing system.

Figure 1:
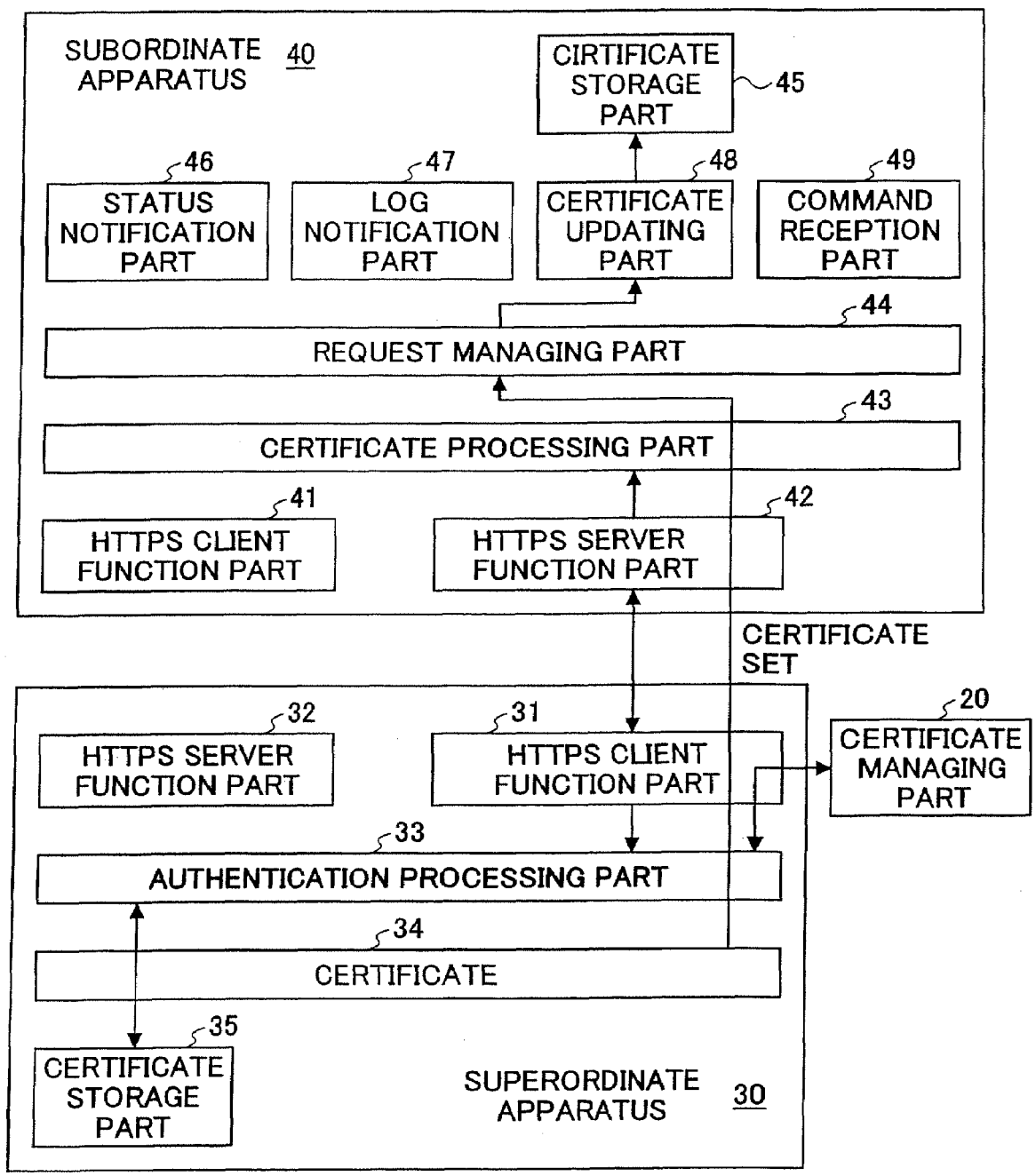
FIG. 1 is a functional block diagram showing the construction of a superordinate apparatus and a subordinate apparatus constituting the communication apparatus according to an embodiment of the present invention.
Figure 2:
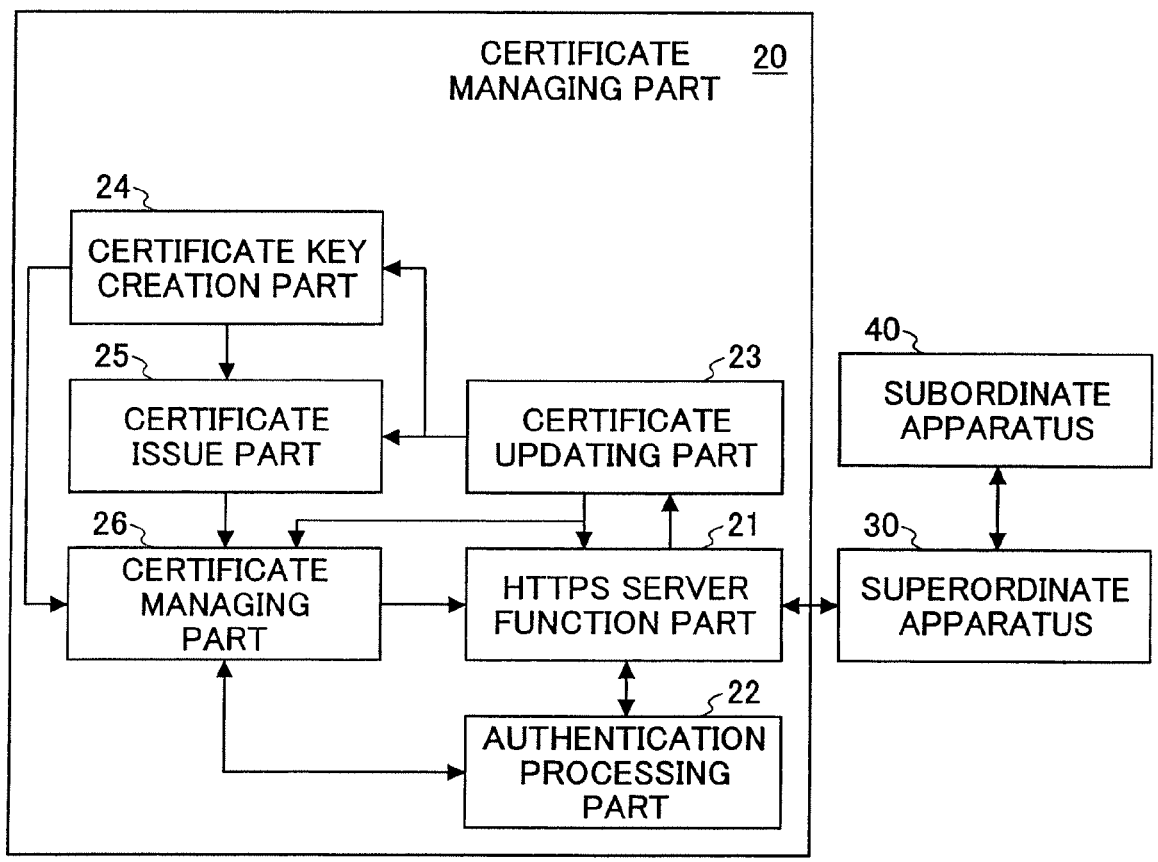
FIG. 2 is a functional block diagram showing the functional construction of a certificate managing apparatus communicating with the superordinate apparatus of FIG. 1.

FIG. 1 shows the block diagram of the foregoing superordinate apparatus and the subordinate apparatus while FIG. 2 shows the certificate managing apparatuses. It should be noted that both of FIG. 1 and FIG. 2 are functional block diagrams showing the functional construction thereof for the part related to the feature of the embodiment. Thereby, it should be noted that illustration of the part not related to the feature of the embodiment is omitted. In the present description, it should be noted that a digital certificate means the digital data attached with signature for preventing forgery.

In this communication system, a superordinate apparatus 30 establishes communication with a subordinate apparatus 40 when to communicate with the subordinate apparatus 40 on the condition that the subordinate apparatus 40 is recognized as a valid communication partner as a result of authentication processing according to a SSL protocol. It should be noted that a SSL protocol is an authentication procedure that uses a public key cryptogram in combination with a digital certificate.

Thereby, the subordinate apparatus 40 returns a response to a request issued from the superordinate apparatus 30 with suitable processing, and the superordinate apparatus 30 and the subordinate apparatus 40 form a client-server system.

Similarly, in the case the subordinate apparatus 40 is going to communicate with the superordinate apparatus 30, the communication is established only when the superordinate apparatus 30 has been recognized as a valid communication partner as a result of authentication processing conducted according to SSL.

Thereby, the superordinate apparatus 30 returns a response to a request issued from the subordinate apparatus 40 with suitable processing, and the superordinate apparatus 30 and the subordinate apparatus 40 form a client-server system.

In any of these cases, the apparatus that request communication is defined as client and the apparatus that is subjected to the request is defined as a server.

Here, the certificate managing apparatus 20 is an apparatus that issues and also manages the digital certificate used for the above mutual authentication processing and is equivalent of a CA.

Figure 18:
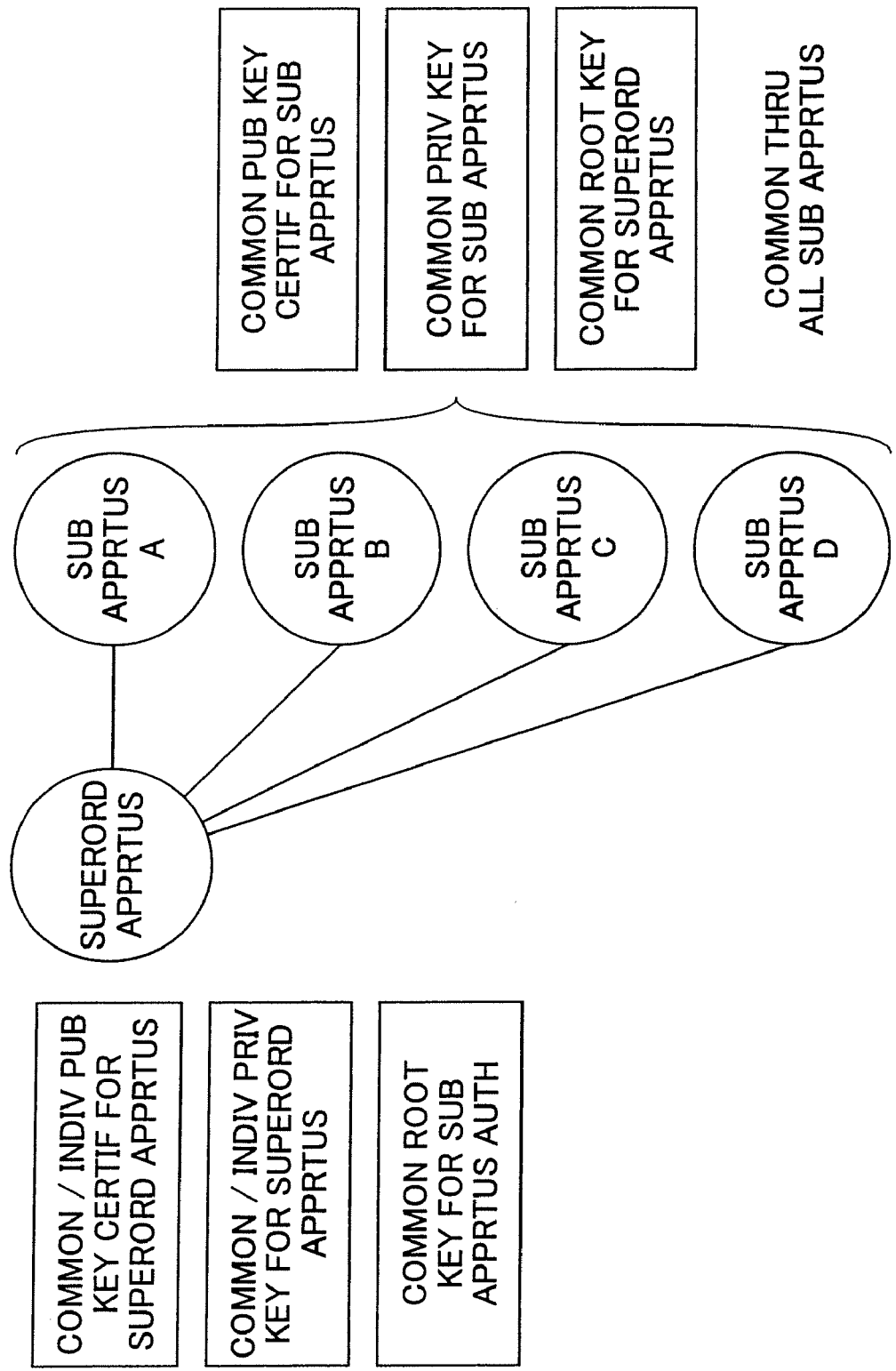
FIG. 18 is a diagram explaining the communication system of the present invention for the case in which there are provided plural subordinate apparatuses.

While there is indicated only one subordinate apparatus in FIGS. 1 and 2, it is also possible to provide plural subordinate apparatuses 40 as shown in FIG. 18. Further, while it is represented in FIG. 1 that there exists only one superordinate apparatus 30 in one communication system, it is also possible that there exist plural superordinate apparatuses 30 in the certificate managing system for example by enabling the certificate managing apparatus 20 to communicate with plural communication systems.

In such a communication system, each node of the certificate managing apparatus 20, the superordinate apparatus 30 and the subordinate apparatus 40 transmits a "request", which is a processing request for the method of the application program implemented mutually, by RPC (remoteprocedure call), including also the communication between the superordinate apparatus 30 and the subordinate apparatus 40. Thereby, a "response" is acquired as a result of the processing thus requested.

In order to realize this RPC, it is possible to use known protocols (communication standard), technologies or specifications, such as SOAP (Simple Object Access Protocol), HTTP (Hyper Text Transfer Protocol), FTP (File Transfer Protocol), COM (Component Object Model), CORBA (Common Object Request Broker Architecture), and the like.

Next, the construction and function of each apparatus that form this communication system will be explained in more detail.

Figure 3:
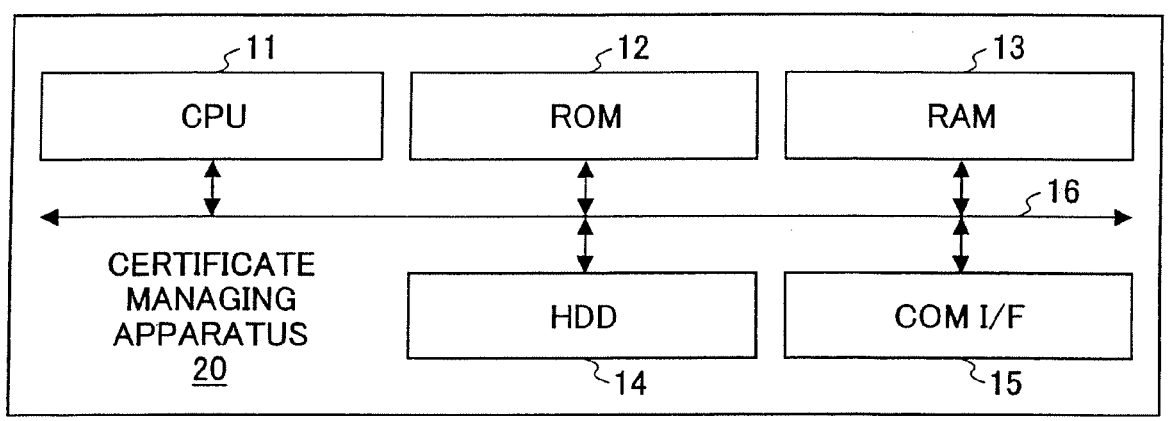
FIG. 3 is a block diagram showing the hardware construction of the certificate managing apparatus shown in FIGS. 1 and 2.

FIG. 3 is a block diagram showing the hardware construction of the certificate managing apparatus 20 shown in FIG. 2.

Referring to FIG. 3, the certificate managing apparatus 20 includes a CPU 11, a ROM 12, a RAM 13, a HDD 14 and a communication interfacing (I/F) 15, and these are connected by a system bus 16. Thereby, the operation of this certificate managing apparatus 20 is controlled by the CPU 11 that executes various control programs stored in the ROM 12 or HDD 14, and with this, the function of the preparation, managing, and the like, of the digital certificate is realized.

For the hardware of certificate managing apparatus 20, it is possible to use a known computer. Needless to say, it is possible to add other hardware according to the needs.

With regard to the superordinate apparatus 30 and the subordinate apparatus 40, various constructions can be taken according to the purpose of the apparatus such as remote managing, electronic commerce, and the like.

In the case of remote managing, for example, one may use an image processing apparatus such as printer, fax apparatus, copy machine, scanner, digital complex machine, and the like, or an electronic apparatus such as network household electric appliances, automatic vending machines, medical appliances, power supply apparatuses, air conditioning systems, or a measuring system of gas, water, electricity supply, and the like, or the electronic apparatus of automobile or aircraft, for the subordinate apparatus 40, which is subjected to management, and use the superordinate apparatus 30 as a managing apparatus that manages the subordinate apparatus 40 by collecting information therefrom or controlling the subordinate apparatus 40 by way of sending a command thereto.

Here, it is assumed that each of the superordinate apparatus 30 and the subordinate apparatus 40 includes at least a CPU, a ROM, a RAM, a communication I/F for communicating with an external apparatus via a network, and memory means for storing information necessary for carrying out the authentication processing. Thereby, the features pertinent to the present embodiment are achieved by the CPU executing a predetermined control program stored in a ROM, and the like.

With regard to the foregoing communication, it is possible to use various communication lines (communication route) including a cable communication line and a wireless communication line as long as they can construct a network. The same applies also to the communication with regard to the certificate managing apparatus 20.

FIG. 1 shows the functional construction of the superordinate apparatus 30 and the subordinate apparatus 40 for the part related to the feature of the present embodiment.

Referring to FIG. 1, the superordinate apparatus 30 is equipped with a HTTPS (Hypertext Transfer Protocol Security) client function part 31, a HTTPS server function part 32, an authentication processing part 33, a certificate renewal request part 34, and a certificate memory part 35.

The HTTPS client function part 31 has the function of requesting communication to the apparatus that has the function of the HTTPS server such as the subordinate apparatus 40 by using the HTTPS protocol that includes the processing of authentication and encryption according to SSL and further causing the communication partner to carry out a desired operation by transmitting thereto a request (command) or data.

On the other hand, the HTTPS server function part 32 has the function of receiving the communication request in the form of HTTPS protocol from the apparatus that has the function of the HTTPS client and receiving further the request or data from the requesting apparatus. Further, the HTTPS server function part 32 causes various parts thereof to carry out the operation corresponding to the request and returns the result to the requesting apparatus as a response.

The authentication processing part 33 has the function of the authentication means that carries out authentication processing by using the digital certificate received from the communication partner and also various certificates, private keys, and the like, stored in the certificate memory department 35. Further, it has the function of transmitting the digital certificate stored in the certificate memory part 35 to the communication partner via the HTTPS client function part 31 or the HTTPS server function part 32 fore requesting authentication to the communication partner.

Further, it has the function of anomaly detection means that detects existence of anomaly in the authentication carried out by using an individualized certificate for a specific situation as will be described later.

As will be described later, the certificate renewal request part 34 has the function of individualized certificate transmission means that transmits an individualized certificate to the partner of communication of the subordinate apparatus 40, and the like, and also the function of individualized certificate renewal means that requests storing of the individualized certificate thus transmitted.

The certificate memory part 35 has the function of storing the authentication information such as various certificates and the private keys and providing the same for the authentication processing carried out by authentication processing part 33. With regard to these various certificates and private keys, explanation will be made later together with the usage and preparation method thereof.

It should be noted that the functions of these various parts is realized by the CPU of superordinate apparatus 30 executing a predetermined control program and controlling the operation of various parts of the superordinate apparatus 30.

In the subordinate apparatus 40, there are provided an HTTPS client function part 41, an HTTPS server function part 42, an authentication processing part 43, a request managing part 44, a certificate memory part 45, a status notification part 46, a log notification part 47, a certificate updating part 48, and a command reception department 49.

Similarly to the HTTPS client function part 31 of the superordinate apparatus 30, the HTTPS client function part 41 has the function of requesting communication to the apparatus having the function of the HTTPS server such as the superordinate apparatus 30 by using the HTTPS protocol and causing the same to carry out the operation corresponding to the transmitted request or data.

The HTTPS server function part 42 is similar to the HTTPS server function part 32 of superordinate apparatus 30 and has the function of accepting the communication request from the apparatus having the function of the HTTPS client, causing various parts of the apparatus to carry out the operation corresponding to the received request or data, and returning a response to the requesting apparatus.

The function of the authentication processing part 43 is also similar to that of the authentication processing part 33 of the superordinate apparatus 30, except that the certificate stored in the certificate memory part 45 is used for the authentication processing.

The request managing part 44 has the function of judging the execution possibility with regard to the request that has been received from the superordinate apparatus. Further, it has the function of transmitting the operation request to the function parts 46-49 that carry out the operation of the request in the case of permitting execution of the request.

FIG. 4 shows the judging criteria.

Referring to FIG. 4, the judgment is made based on the type of the request and further on the type of the digital certificate that has been used for the authentication processing in the authentication processing part 43.

The digital certificate stored in the superordinate apparatus 30 and the subordinate apparatus 40 includes an individualized public key certificate, which is a common certificate or individualized certificate including the identification information of the apparatus (own machine), and a common public key certificate, which is also a public key certificate but without the identification information of the apparatus, as will be explained later in detail.

As shown in FIG. 4, the request managing part 44 permits all the operations in the case authentication has been made by using the individualized certificate, while it permits only the updating of the certificate in the event the authentication has been made by using the common certificate. Thus, the common certificate is a certificate used only when storing a new individualized certificate to the subordinate apparatus 40.

The certificate memory part 45 stores various authentication information and private keys similarly to the certificate memory part 35 of the superordinate apparatus and has the function of the certificate memory means provided for the authentication processing in the authentication processing part 33. However, the certificate is stored therein is different from the one stored in the authentication processing part 33 as will be described later.

The status notification part 46 has the function of notifying the state of the subordinate apparatus 40 to the superordinate apparatus 30 in the case of detecting abnormality or instructions has been given from a use. This notification may be transmitted as a response to the inquiry from the superordinate apparatus 30 or may be transmitted by requesting communication from the HTTPS client function part 41 to the superordinate apparatus.

The Log notification part 47 has the function of notifying the log from the subordinate apparatus 40 to the superordinate apparatus 30. The content of the notification may include, in addition to the operation log of the subordinate apparatus 40, the counting value of image formation counter counting the number of sheets in the case the subordinate apparatus 40 is an image formation apparatus, or measuring value in the case the subordinate apparatus 40 is a measuring system. Because this notification does not need urgency, the notification may be transmitted at the time of responding to the inquiry from the superordinate apparatus 30.

The certificate updating part 48 has the function of updating the certificate, and the like, held in the certificate memory part 45 by a certificate and the like, which has been received from the superordinate apparatus 30.

The command reception part 49 has the function of executing the operations corresponding to the request related to functions other than those of the function parts 46-48 mentioned above. An example of this action may be the transmission of the data stored in the subordinate apparatus 40 or control of engine part not illustrated.

Further, the functions of these various parts are realized by the CPU of the subordinate apparatus 40 executing a predetermined control program controlling the operation of various parts of the superordinate apparatus 40.

Here, it should be noted that the status notification part 46 and the log notification part 47 are represented as mere example of the functions provided by the command reception part 49 and that providing of these functions is by no means an indispensable matter for the present invention.

Also, FIG. 2 shows the function and construction for the part that becomes the characteristic feature of the certificate managing apparatus 20 according to this embodiment.

As shown in the drawing, the certificate managing apparatus 20 includes an HTTPS server function part 21, an authentication processing part 22, a certificate updating part 23, a key creation part 24, certificate issuance part 25, and a certificate managing part 26.

Similarly to the HTTPS server function part of the superordinate apparatus 30 or the subordinate apparatus 40, the HTTPS server function part 21 has the function of accepting the communication request from the apparatus that has the function of the HTTPS client, causing the various parts in the apparatus to operate according to the received request or data, and returning the response to the requesting apparatus.

The function of the authentication processing part 22 is similar to that of the authentication processing part of the superordinate apparatus 30 and the subordinate apparatus 40, except that it uses the certificate, and the like, held in the certificate managing part 26 for the authentication processing. The type, use and the function of the certificate will be explained later.

The certificate updating part 23 has the function of causing the key creation part 24 and the certificate issuance department 25 to issue a new individualized certificate of the subordinate apparatus 40 in the case there has been a request from the superordinate apparatus 30 for issuance of an individualized certificate, and transmitting the same to the superordinate apparatus 30 via the HTTPS server function part 21 from the certificate managing part 26.

The authentication key creation part 24 has the function of certification key creation means that creates a route private key, which is a private key for certification and used for creation of the digital signature, and a root key, which is a public key for certification (certification key) corresponding to the route private key.

The certificate issuance part 25 has the function of issuing the public key used for the authentication processing according to the SSL protocol and further the private key corresponding to the public key to the certificate managing apparatus 20 itself and also to the superordinate apparatus 30 and the subordinate apparatus 40, and further have the function of certificate issuing means that issues a public key certificate (a digital certificate) by attaching a digital signature to each of the issued public keys by using the route private key crated by the certificate key creation part 24. Further, the certificate issuance part 25 also has the function of issuing a root key certificate, which is a certificate in which a digital signature is attached to the root key.

The certificate managing part 26 has the function of certificate managing means that manages the digital certificate issued by the certificate issuing part 25, the route private key used for the creation of the digital certificate and the root key corresponding to the route private key. Thereby, the certificate managing part 26 stores the certificate and the key together with information regarding to the term of validity, destination, ID, history of updating, and the like. Further, it has the function of submitting the certificate or private key issued to the certificate managing part 26 itself for authentication processing in the authentication processing part 22.

Again, it should be noted that the foregoing functions of the various parts are realized by the CPU of the certificate managing apparatus 20 that executes a predetermined program that controls the operation of the various parts of the certificate managing apparatus 20.

Next, explanation will be made about the characteristics and use of the certificates and keys used in the foregoing apparatuses mentioned above for the authentication processing.

Figure 5A:
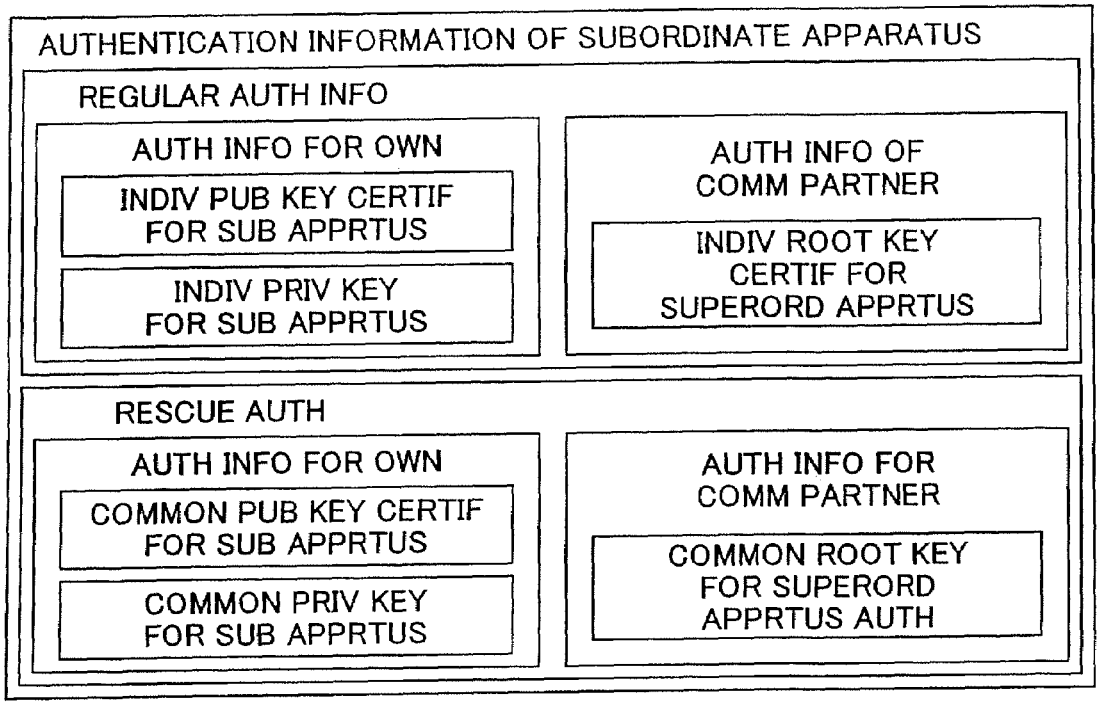
FIGS. 5A and 5B are diagrams explaining authentication information stored in the superordinate apparatus and the subordinate apparatus shown in FIGS. 1 and 2.
Figure 5B:
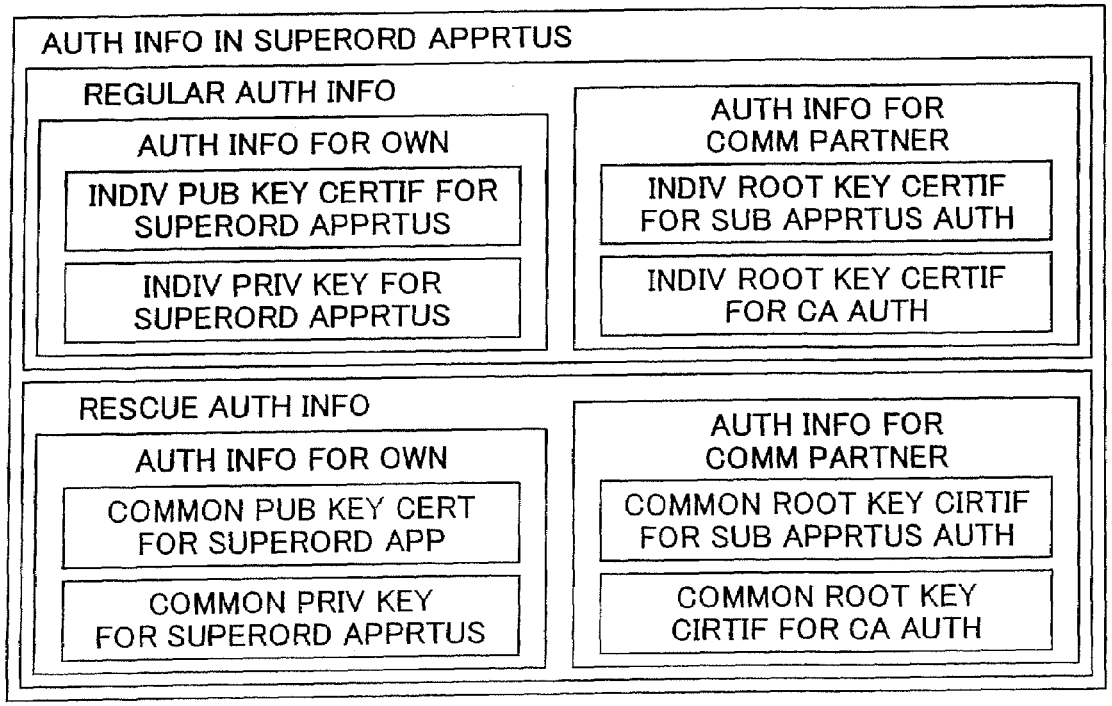
Figure 6:
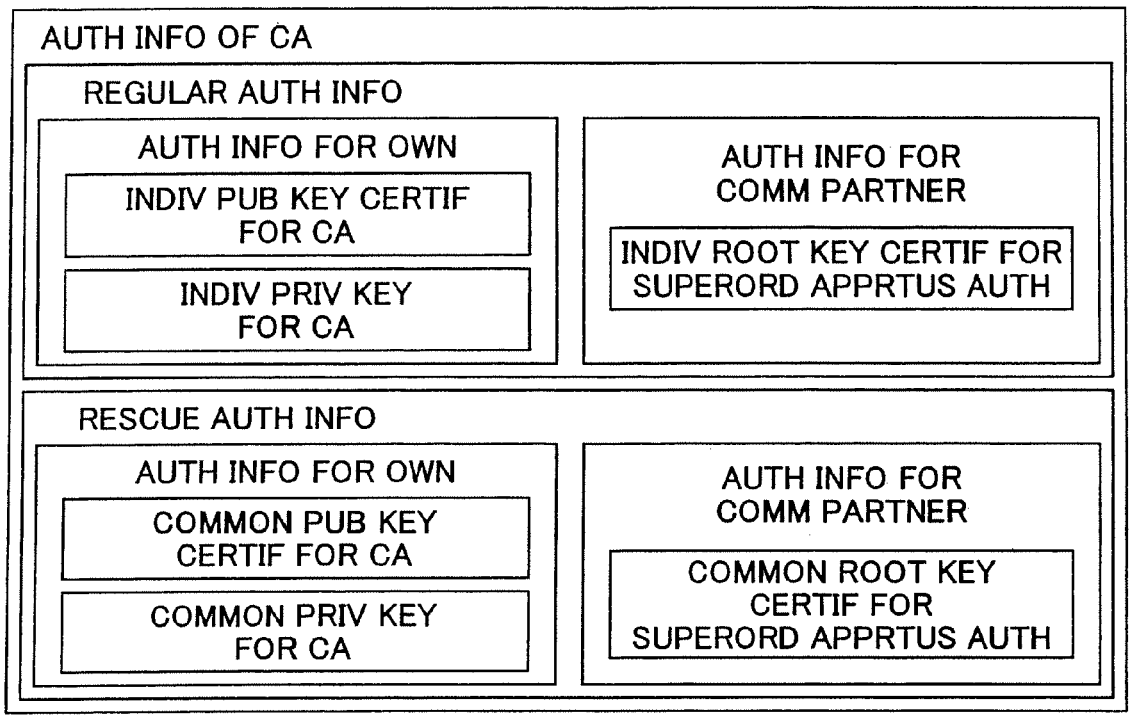
FIG. 6 is a diagram explaining the authentication information stored in the certificate managing apparatus.

FIG. 5A shows the types of the certificates and keys stored in the certificate memory part 35 of the superordinate apparatus 30, while FIG. 5B shows the type of the certificates and keys stored in the certificate memory part 45 of the subordinate apparatus 40. Further, FIG. 6 is a diagram showing the certificates and keys stored in the certificate managing part 26 of the certificate managing apparatus 20 and used for authentication processing in the certificate managing apparatus 20.

Generally, the authentication information stored in the superordinate apparatus, the subordinate apparatus and the certificate managing apparatus 20 is classified into a regular authentication information and a rescue authentication information.

Each of the regular authentication information and the rescue authentication information is formed of a public key certificate and a private key, which form the authentication information for itself and a root key certificate, which is the certificate information with regard to the communication partner.

Figure 19:
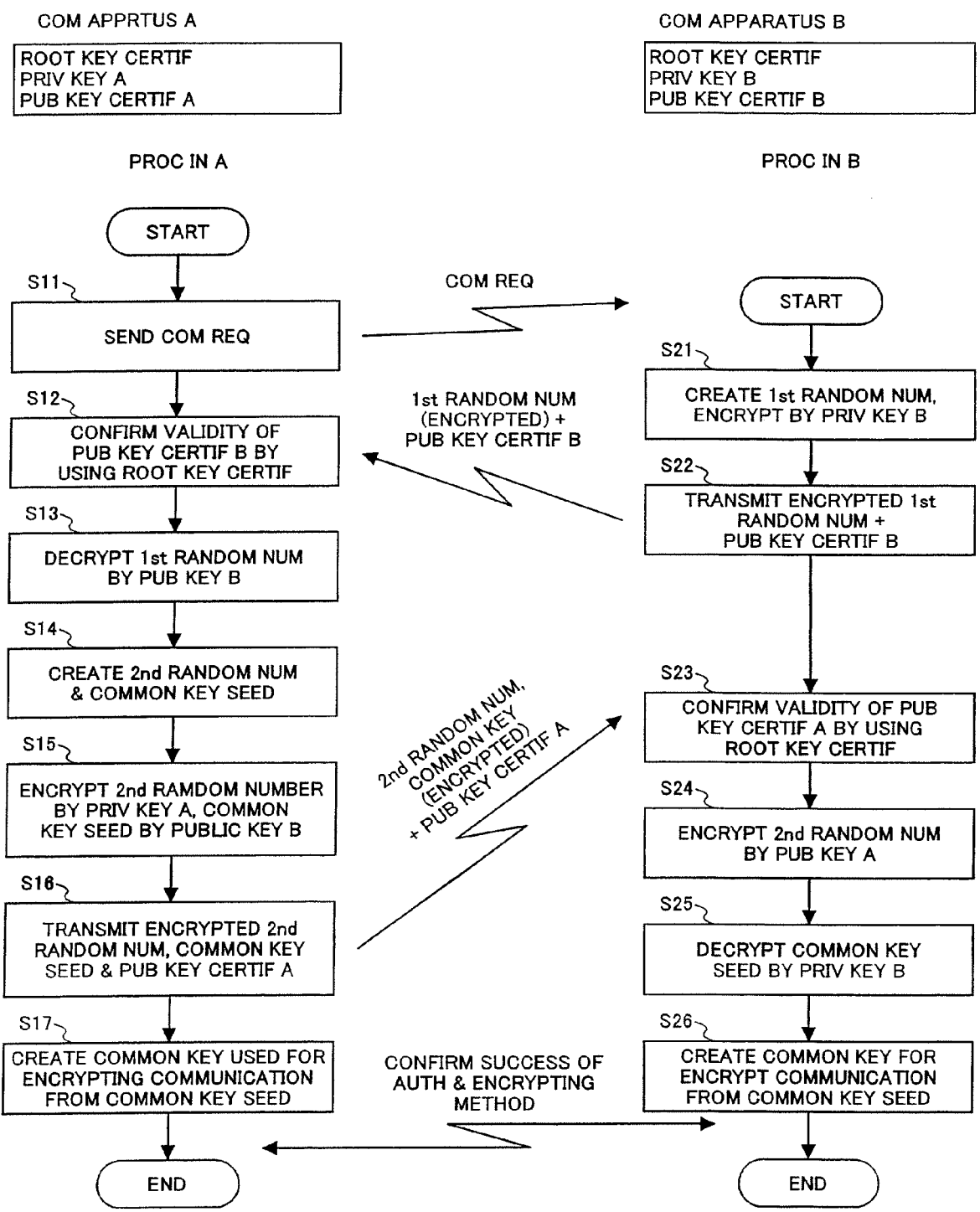
FIG. 19 is a flowchart showing the processing executed in a communication system in which two communication apparatuses carry out mutual authentication according to SSL together with the information used for the processing.
Figure 20A:
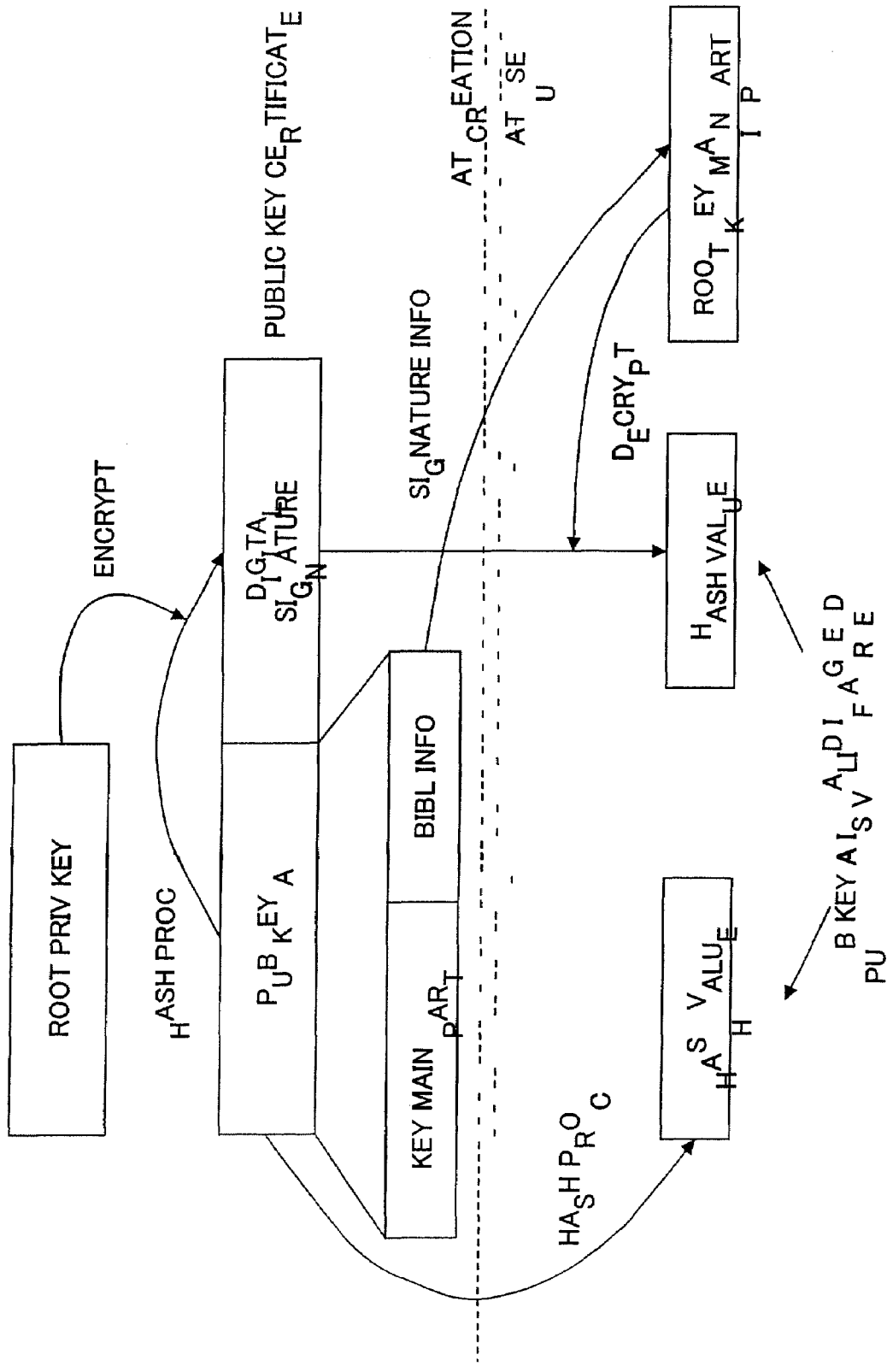
Figure 21:
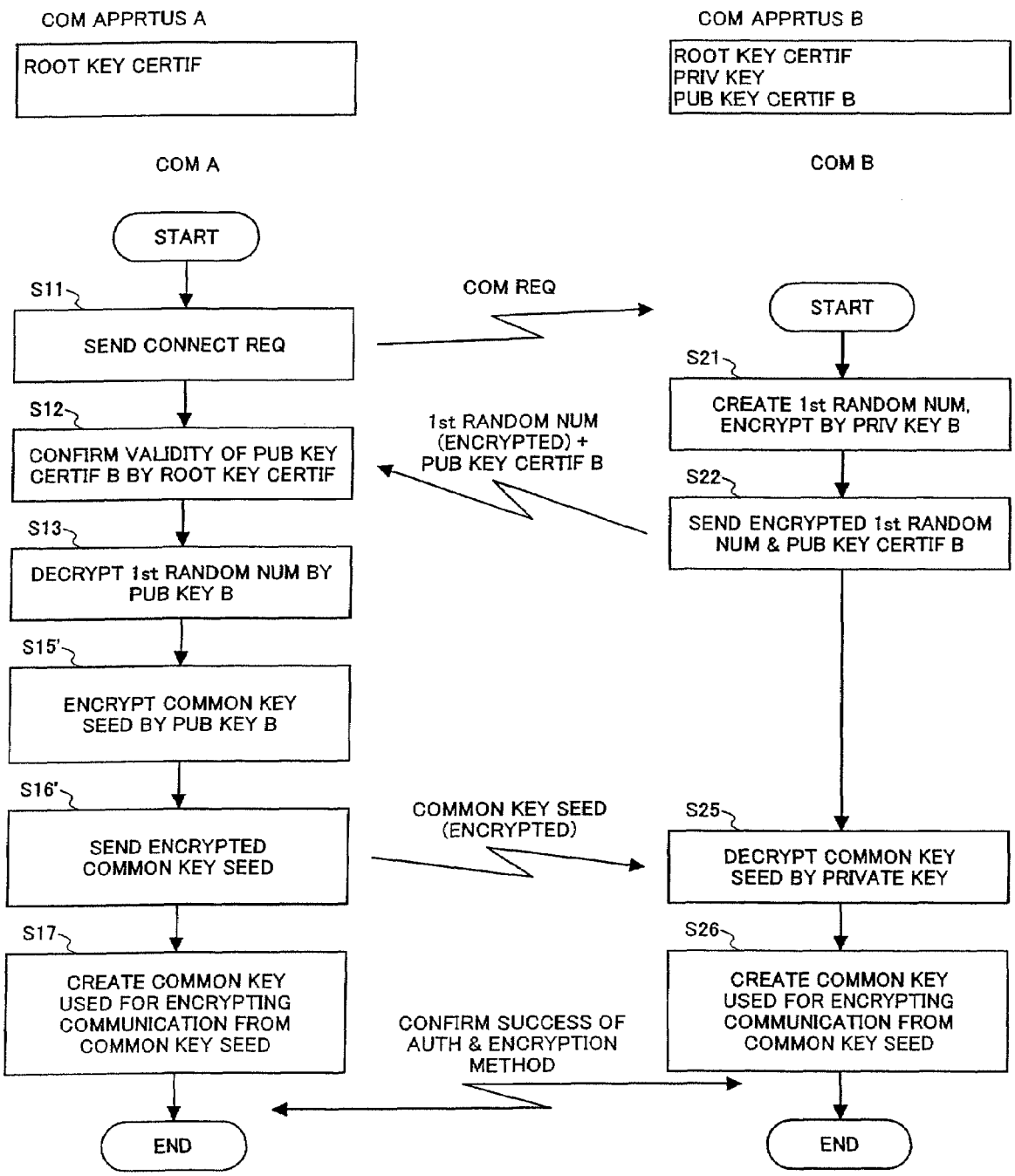
FIG. 21 is a diagram corresponding to FIG. 19 showing the processing executed in the case two communication apparatuses carry out single-direction authentication according to SSL.

Thus, each apparatus carries out the mutual authentication shown in FIG. 19 or the single-direction authentication shown in FIG. 21 according to SSL by using the regular authentication information at the time of normal communication.

Further, it should be noted that the individualized public key certificate of the subordinate apparatus is a digital certificate in which a digital signature allowing confirmation of validity thereof by using an individualized root key used for the authentication of the subordinate apparatus, is attached to the individualized public key issued by the certificate managing apparatus 20 to the subordinate apparatus 40.

Figure 7:
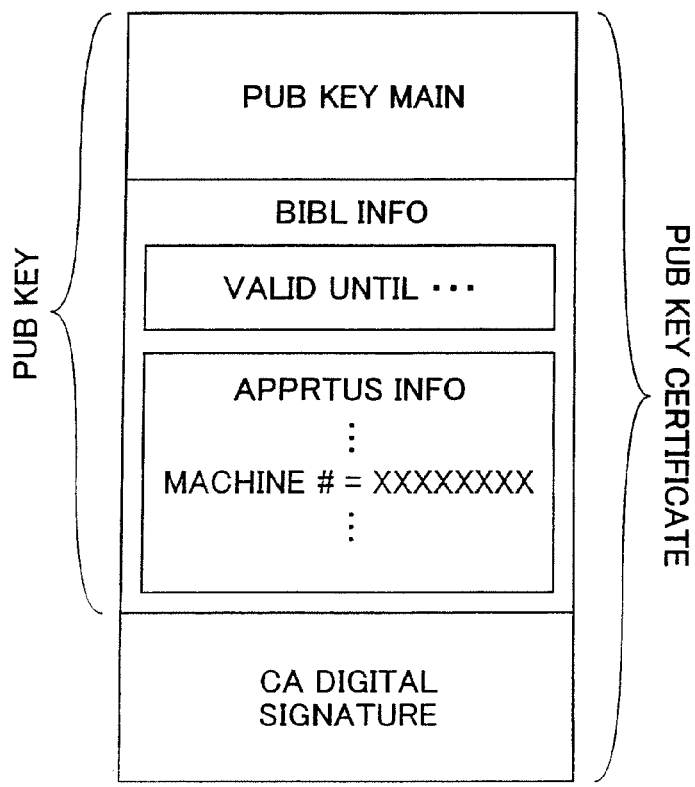
FIG. 7 is a diagram explaining the information included in individualized public key certificate.

FIG. 7 shows the construction of the individualized public key certificate for the subordinate apparatus.

Referring to FIG. 7, it will be noted that the individualized public key certificate for the subordinate apparatus includes, in the bibliographic information thereof, the machine code information of the subordinate apparatus 40 as the identification information of the subordinate apparatus 40 to which the certificate is issued. Further, it is possible to include information such as the machine number or registered user of the subordinate apparatus 40 in the foregoing bibliographic information.

Further, the individualized private key for the subordinate apparatus and the individualized root key certificate for authentication of the subordinate apparatus are digital certificates, in which the digital certificate forming the individualized private key for the subordinate apparatus is attached with a digital signature allowing confirmation of validity thereof by itself by using a private key corresponding to the individualized public key, while the digital certificate forming the individualized root key certificate for authentication of the subordinate apparatus is attached with a digital signature allowing confirmation of validity thereof by itself by using the route private key corresponding to the individualized root key for authentication of the subordinate apparatus.

In the case there are provided plural subordinate apparatuses 40, the digital signatures attached to the individualized public keys of the apparatuses are created by using the same route private key such that a common individualized root key certificate is used for the confirmation of validity. On the other hand, the individualized public key or the private key corresponding thereto changed depending on the apparatuses.

A similar relationship holds between the public key certificate for the superordinate apparatus, the individualized private key for the superordinate apparatus and the individualized root key certificate for the authentication of the superordinate apparatus. Further, a similar relationship holds between the individualized public key certificate for CA, the individualized private key for CA, and the individualized root key certificate for authentication of CA.

In the case the superordinate apparatus 30 and the subordinate apparatus 40 carry out mutual authentication, the subordinate apparatus 40 transmits, in response to the communication request from the superordinate apparatus 30, a first random number encrypted by the individualized private key of the subordinate apparatus to the superordinate apparatus 30 together with the individualized public key certificate of the subordinate apparatus.

The superordinate apparatus 30 confirms the validity of this individualized public key certificate of the subordinate apparatus by using the individualized root key certificate of the subordinate apparatus that the individualized public key certificate of the subordinate apparatus is not damaged or falsified, and upon confirmation of the above, the first random number is decrypted by using the public key attached to the public key certificate of the subordinate apparatus.

When this decrypting has been achieved successfully, the superordinate apparatus 30 can confirm that the subordinate apparatus 40 forming the communication partner is duly the destination of the individualized public key certificate of the subordinate apparatus, and the apparatus is identified from the identification information included in the certificate. Further, it becomes also possible to determine whether the authentication has succeeded or failed depending on whether or not the identified apparatus is an appropriate apparatus for the communication partner.

In the side of the subordinate apparatus 40, too, it becomes possible to carry out a similar authentication, by receiving the random number encrypted by the individualized public key certificate of the superordinate apparatus and the individualized private key of the superordinate apparatus and transmitted to the subordinate apparatus 40 in the case authentication has been successfully made in the superordinate apparatus 30, and by using the stored root key certificate for authentication of the superordinate apparatus.

It should be noted that the foregoing procedure is for the case of the superordinate apparatus 30 requesting communication to the HTTPS server function part 42 of the subordinate apparatus 40 by the HTTPS client function part 31. In the case the subordinate apparatus 40 requests communication to the HTTPS server function part 32 of the superordinate apparatus 30 by the HTTPS client function part 41, the same certificate and key are used. On the other hand, the processing in the superordinate apparatus 30 and the processing in the subordinate apparatus 40 are exchanged.

The same applied also to the case the superordinate apparatus 30 and the certificate managing apparatus 20 make communication.

As will be understood from the explanation heretofore, the validity of the individualized public key certificate is not confirmed even in the case each apparatus has transmitted its individualized public key certificate to the communication partner when the communication partner does not hold the individualized root key certificate corresponding to the individualized public key certificate. In such a case, the authentication fails.

It should be noted that the root key and the route private key forming a pair are provided with a term of validity and subjected to updating with a predetermined interval. Further, updating is carried out also in the case the leakage of the route private key is discovered.

When carrying out the foregoing updating, a new public key certificate attached with a digital signature made by using a new route private key is created for the entire public key certificates that have been attached with the old digital signature made by using the route private key certificate to be updated. Thereby, the old public key certificates distributed to the various destinations are replaced with this new public key certificate. At the same time, a new rout key certificate corresponding to the new route private key is created and distributed to all the apparatuses that can become the communication partner of each destination of the root key certificate.

Incidentally, in the case of updating the root key and the root private key like this, it is not necessary to update the public key and the private key themselves of each apparatus. It is sufficient to recreate the digital signature.

Thus, in the description hereinafter, the updating of the root key and the root private key will be referred to as the version up of the certificate, and the public key certificate and the root key certificate will be called a certificate of a certain version corresponding to the route private key used for the creation of the digital signature. In the case of updating the public key and the secret key of an apparatus, there is no change in the rout key and the route private key. Thus, there occurs no version change even when the content of the public key certificate has been changed.

Thus, when the updating associated with the version up has made successfully for all of the apparatuses, each apparatus can confirm the validity of the individualized public key certificate received from the communication partner by using the new individualized root key certificate and there occurs no problem in the authentication or communication.

On the other hand, in the case there exists an apparatus in which the updating of the individualized public key certificate or the individualized root key certificate has not been made by the reason such as the apparatus being not connected to the network at the time of updating of the individualized root key, authentication becomes no longer possible and the apparatus is disconnected from the network. It should be noted that the apparatuses in which the individualized root key has been updated does not maintain the old individualized key certificate. Thus, there is no means of confirming the validity of the old individualized public key certificate.

Further, the apparatuses having the old individualized root key cannot confirm the validity of the new public key certificate, and thus, the apparatuses having the old certificate cannot authenticate the apparatuses having the updated certificate.

In order to prevent occurrence of such a situation, it is possible to maintain the old individualized root key certificate even after the individualized root key has been updated. However, such an approach is not realistic in view of the fact that it requires a large memory capacity for maintaining the individualized root key certificates of the past. Further, in view of the need of highly reliable memory means for storing a certificate, such an approach increases the cost of the system, particularly in view of the need of providing sufficient capacity for storing future root key certificates. Further, such an approach raises the problem of complex processing in view of the fact that each of the apparatuses has to manage a large number of certificates appropriately and select a necessary certificate.

With regard to the public key certificate, it should be noted also that the server, not knowing the statues of the client at the time a communication request comes in from the client, inevitably returns the same public key certificate to the client in the SSL protocol when access is made to a particular URL (Uniform Resource Locator). Thus, it is not possible to use a construction of maintaining plural individualized public certificates and transmitting a suitable certificate selectively in accordance with the individual root key certificate of the communication partner.

Although it is possible the URL with the number equal to the number of the mutually different individualized public key certificates in the server and transmit an individualized public key certificate according to the URL to which the access has been made, such an approach of enabling the use of all the individualized public key certificates used in the past and to be used in the future is also unrealistic because of the reason similar to the case of the foregoing root key certificate.

Although the certificate managing apparatus 20 stores all the certificates and the keys issued in the past in the certificate managing part 26, providing all of these certificates in the state ready for use is also unrealistic.

In addition, there can be a case in which the certificates may undergo damaging for example by the failure of the updating. In such a case, recovery is not possible even when the communication partner holds the old certificate.

Thus, in order to restore the communication of the apparatus that has lost the communication because of the failure of the authentication made by using the individualized certificate, it is necessary to store, in the apparatus to be restored, the individualized public certificate corresponding to the individualized root key certificate held by the communication partner and the individualized root key certificate corresponding to the individualized public key certificate held by the communication partner.

As long as each apparatus can perform only the authentication by using the individualized public key certificate, there is no possibility of transmitting a new individualized public key certificate or individualized root key certificate via the network safely when this authentication has become impossible.

In the present invention, each of the communication apparatuses constituting the communication system of the present embodiment holds the rescue authentication information for dealing with such a situation and is thus capable of transmitting the individualized public key certificates and the like to the necessary apparatuses over the network safely.

This rescue authentication information has the construction generally identical to that of the regular authentication information. For example, the common public key certificate for the subordinate apparatus may have the form of a digital certificate, in which the common public key issued by the certificate managing apparatus 20 for the subordinate apparatus is attached with a digital signature allowing confirmation of validity thereof by using the common root key for the authentication of the subordinate apparatus. It should be noted that the common private key for the subordinate apparatus is a digital certificate attached with a digital signature enabling confirmation of validity thereof by using itself for the private key corresponding to the common public key.

Similarly, the common root key certificate for the authentication of the subordinate apparatus is a digital certificate attached with a digital signature enabling confirmation of validity thereof by using itself for the common root key for the authentication of the subordinate apparatus.

On the other hand, there exists a major difference over the regular authentication information in that the identification information of the apparatus is not included in the bibliographic information of the common public key certificate, and that a common public key certificate is held throughout the apparatuses of the same rank (in the example of FIGS. 1 and 2, there exit three ranks of "certificate managing apparatus", "superordinate apparatus" and "subordinate apparatus").

In this case, there is no need of distinguishing each apparatus of the same rank individually, and the same key can be used for the common public key included in the certificate and also for the common private key corresponding to the common public key.

Because the common public key certificates are the same for the communication partner, the root key certificate becomes common also for all the apparatuses that can become a communication partner of an apparatus of an arbitrary rank.

Thus, in the case there are provided plural apparatuses as shown in FIG. 18, all the subordinate apparatuses holds the same rescue authentication information.

This applies also to the rescue authentication information of the superordinate apparatus 30 or the rescue authentication information of the certificate managing apparatus 20.

In the case of unifying the data format with the individualized public key certificate, it is also possible to describe the "machine number 0" in the format shown in FIG. 7, for example, so as to indicate that the certificate is a common public key certificate.

Because the same rescue authentication information is used commonly for the apparatuses of the same rank, it is possible to memorize the rescue authentication information corresponding to the apparatus and hence the rank into the apparatus at the time of manufacturing of the apparatus. Because it is not the information including the identification information of the apparatus, there is no need of preparing individual certificates to the apparatuses finished with the inspection step and given with the identification number, and it is possible to write the rescue authentication information into a large number of apparatuses by a simple work. For example, the rescue authentication information is included in the master of the control program and write the rescue authentication information at the time of copying the control program to the apparatus.

Unless the rescue authentication information is not updated, the authentication of the apparatus is possible by using the common public key certificate included in the rescue authentication information in the case updating of the regular authentication information has failed or the regular authentication information has been damaged and authentication by the individualized public key certificate has become impossible.

Because the common public key certificate does not include the identification information of the apparatus, it is not possible to identify the partner of the communication exactly when the authentication has been made by using the common public key certificate. However, even in such a case, it is possible to acquire some information about the communication partner.

For example, in the case a vendor has written the rescue authentication information (common public key certificate for the subordinate apparatuses, common private key for the subordinate apparatuses and the common root key certificate for authentication of the superordinate apparatuses) for all of the produces that can become the subordinate apparatus 40 and write the rescue information for the superordinate apparatuses (common public key certificate for the superordinate apparatuses, common private key for the superordinate apparatuses and the common root key certificate for authentication of the subordinate apparatuses) to the products that can become the superordinate apparatus 30 when communicating with the foregoing product forming the subordinate apparatus 40, the subordinate apparatus 40 can recognize that the communication partner transmitting the public key certificate that enables confirmation of validity by the own common root key certificate for authentication of the superordinate apparatus, is a machine of the same vendor and used for the superordinate apparatus 30. Conversely, the superordinate apparatus 30 can recognize that the partner transmitting the public key certificate that enables confirmation of validity by the own common root key certificate is a product of the same vendor and used for the subordinate apparatus 40.

When such authentication has been made successfully, it becomes possible to setup a safe communication route to the communication partner by using common key encryption by exchanging a common key as noted before. Thereafter, it is possible to identify the communication partner by exchanging the machine number information and the like. A similar procedure is also possible between the certificate managing apparatus 20 and the superordinate apparatus 30.

Thus, in the case authentication has been unsuccessful (failed) by using the individualized common key certificate, it becomes possible in the present invention to detect the existence or nonexistence of anomaly of authentication by attempting authentication to the same communication partner by using the common public key certificate.

Thus, when the authentication using the common public key certificate has been successful, this means that the communication partner is duly the apparatus assumed as being the communication partner, and that the detected failure of the authentication means that there has been anomaly in the authentication conducted by using the individualized certificate.

On the other hand, in the case the authentication that uses the common public key certificate has failed, this means that the communication partner is not the apparatus assumed as being a communication partner and that the failure of the authentication by using the individualized public key certificate has been caused because of choosing inappropriate communication partner, not by the anomaly caused in the authentication process.

Thus, one remarkable feature of the present embodiment is to carry out such a decision by using two digital certificates, one being the individualized public key certificate and the other being the common public key certificate.

Of course, the failure of authentication can be caused also by the failure of communication. In this case, however, the anomaly can be detected at the time of reception of the certificates and the like, and can be easily distinguished form the case of improper content of the certificates.

Figure 8:
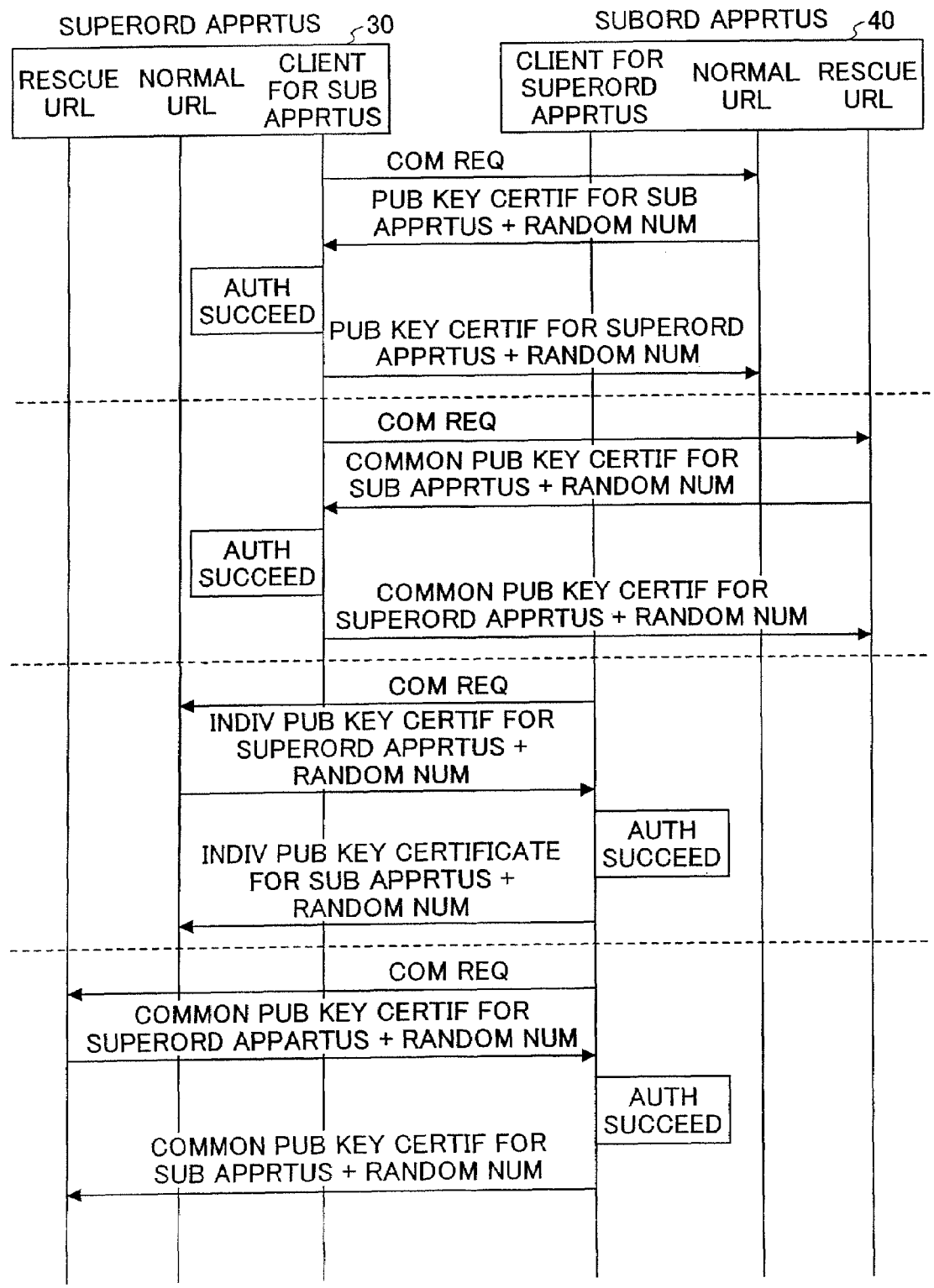
FIG. 8 is a diagram explaining the construction for the superordinate apparatus and the subordinate apparatus shown in FIGS. 1 and 2 to use the individualized public key certificate and the common public key certificate appropriately.

FIG. 8 shows the construction of using the individualized public key certificate and the common public key certificate in the apparatuses shown in FIGS. 1 and 2. Although FIG. 8 shows only the superordinate apparatus and the subordinate apparatus 40 alone, a similar construction is possible also for the certificate managing apparatus 20.

As explained before, the server can return a specific public key certificate to the clients requesting communication. In the case there are different URLs according to the communication request, on the other hand, it is possible to return different public key certificates for different URLs.

Thus, as shown in FIG. 8, each of the superordinate apparatus 30 and the subordinate apparatus 40 is provided with a normal URL carrying out the authentication by using the individualized public key certificate and the rescue URL carrying out the authentication by using the common public key certificate, and the apparatus requesting the communication (the side functioning as the client) transmits the communication request to any of the URLs according to the type of the requested authentication.

These different URLs are realized by using physically the same apparatus by changing the IP address or port number (any one of these is sufficient) such that there are formed logically different apparatuses having different URLs. In other words, the construction of FIG. 8 realizes the function of so-called virtual server.

In such a construction, the apparatus receiving the communication request (the side functioning as a server) changes the certificate to be returned in response to the request according to the URL used for receiving the request, such that the individualized public key certificate is returned when the communication request has been received at the normal URL and the common public key certificate is returned when the communication request has been accepted at the rescue URL.

Because the client knows what URL the communication request has been sent, and thus, the client chooses the appropriate public key certificate according to the selected URL when carrying out the mutual authentication.

In the case it has been determined that there exists anomaly in the authentication that uses the individualized public key certificate based on the success of authentication by using the common public key certificate, the situation of the failure can be any of the case in which the regular authentication information of the communication partner does not correspond to the regular authentication information of the source of the transmission request, or the regular authentication information of the communication partner is destroyed. Because the authentication that uses the common public key certificate has been made successfully, it is difficult to conceive that there exists anomaly in the sequence of communication itself or the sequence of the authentication processing.

Thus, in the present embodiment, there is provided, in the communication system of FIGS. 1 and 2, the function of updating the regular authentication information of the subordinate apparatus 40 in the superordinate apparatus 30 in the case the authentication by using the common public key certificate has been made successfully. This is another important feature of the present embodiment.

Thus, in the case the superordinate apparatus 30 requests communication to the subordinate apparatus 40, it carries out at first the authentication using the individualized public key certificate by transmitting the communication request to the normal URL.

When this has been failed, then the superordinate apparatus transmits the communication request to the rescue URL and achieves authentication by using the common public key certificate.

When this has been made successfully, it acquires the certificate set for updating (or new certificate set) from the certificate managing apparatus 20 and transmits the same to the subordinate apparatus 40. Thereby, the superordinate apparatus 30 requests the subordinate apparatus 40 to store the updating certificate set or the new certificate set.

Thereby, it should be noted that even in the case of the authentication using the common public key certificate, exchange of the common key is possible similarly to the case of the individualized public key certificate, and the transmission of the certificate set can be carried out safely in the encrypted state by using the exchanged common key.

FIG. 9 shows the construction of the certificate set.

Here, it should be noted that the route private key used for creation of the individualized public key certificate for the subordinate apparatus corresponds to the root key included in the individualized root key certificate for the subordinate apparatus stored in the superordinate apparatus 30 at the time of the acquisition. Further, the individualized root key certificate for the superordinate apparatus includes the root key certificate enabling confirmation of the digital signature attached to the individualized public key certificate of the superordinate apparatus held also in the superordinate apparatus 30.

Thus, in the case the individualized public key certificate created by an old route private key has been stored in the subordinate apparatus, the certificate set for updating includes the public key certificate of the new version created for the subordinate apparatus by using the new route private key or the individualized root key certificate of the new version for the superordinate apparatus.

With regard to the public key itself in the individualized public key certificate for the subordinate apparatuses or the individualized private key for the subordinate apparatuses, these can be created newly. Alternatively, in the case the keys issued in the past to the subordinate apparatus 40 are managed, it is possible to continue using the key. Further, it is possible to carry out version up of the public key certificate at the time of issuing the certificate set for updating by newly issuing a route private key.

On the other hand, the subordinate apparatus 40 updates the old regular authentication information by storing the received certificate set in the certificate memory part 45 upon acceptance of the foregoing request.

When this updating has been achieved properly, the superordinate apparatus 30 and the subordinate apparatus 40 store the individualized root key certificates enabling mutual confirmation of the individualized public key certificate, and it becomes possible to carry out authentication by using the individualized public key certificate. Thus, after this, communication becomes possible by carrying out authentication by using the individualized public key certificate.

In the authentication information shown in FIGS. 5 and 6, it is possible to use the same individualized root key certificate irrespective of the subject of authentication (for example, it is possible to use the same root key certificate for the root key certificate for the superordinate apparatus and for the root key certificate for the subordinate apparatus). This is because the individualized certificate includes the identification information of the individual apparatuses and it becomes possible to identify the type or rank of the apparatus by referring to the identification information once the validity thereof is confirmed by using the root key certificate.

In the case of the common certificate, there is no identification information of the apparatuses, and thus, the distinction of the apparatuses is made by whether or not the validity is confirmed by using a specific root key certificate. Thus, it is preferable to change the common root key certificate according to the group subjected to authentication.

Next, explanation will be made on the anomaly detection and updating of the certificate by using the individualized certificate and the common certificate will be explained.

Figure 10:
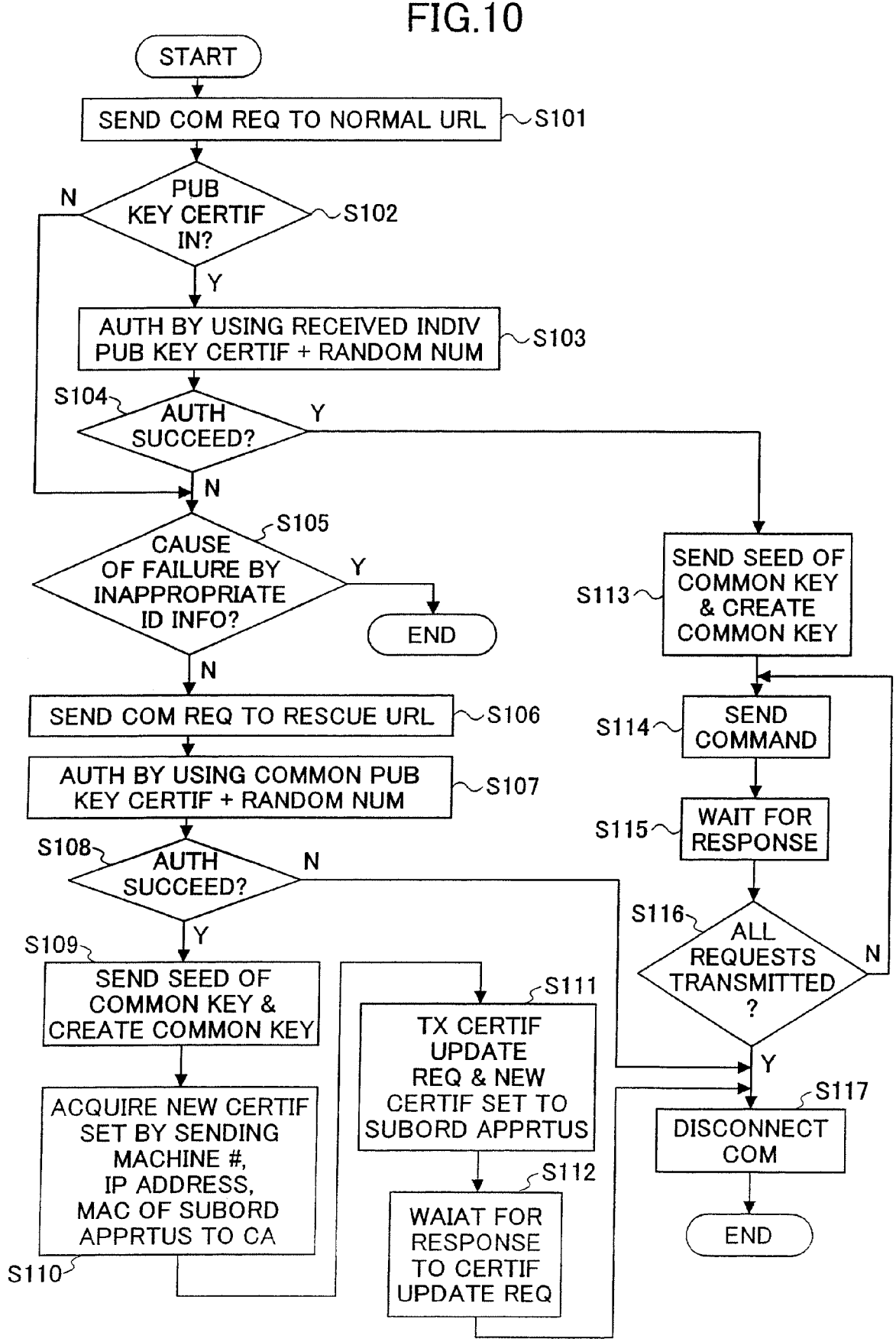
FIG. 10 is a flowchart showing an example of the processing carried out by the superordinate apparatus in a communication system of the present invention for anomaly detection and updating of the certificate by using an individualized certificate and a common certificate.
Figure 11:
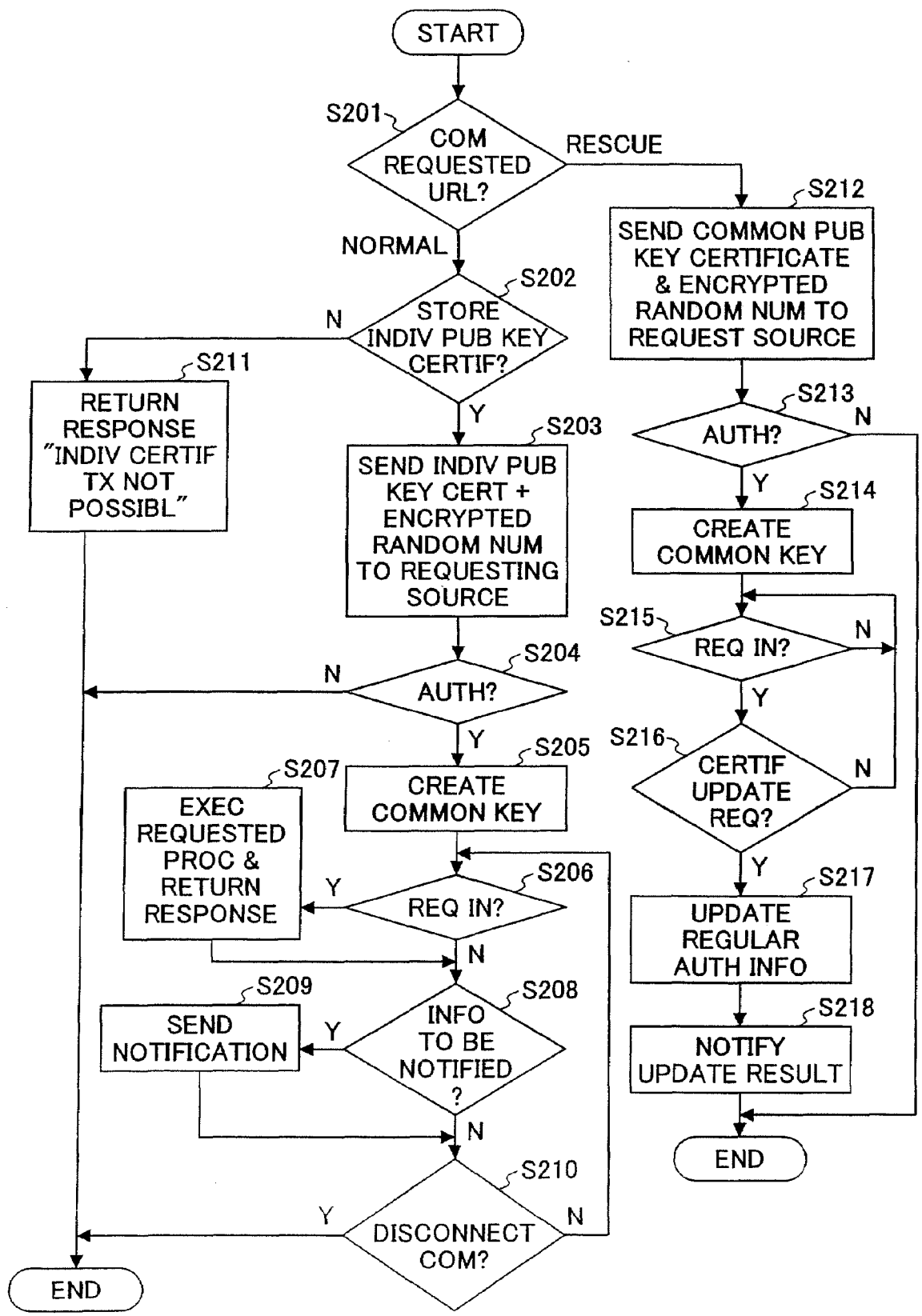
FIG. 11 is a flowchart showing an example of the processing carried out by the subordinate apparatus.

FIG. 10 is a flowchart showing the processing conducted in the side of the superordinate apparatus 30, while FIG. 11 is a flowchart showing the processing conducted in the side of the subordinate apparatus 40. It should be noted that these apparatuses are carried out by the respective CPUs of the superordinate apparatus and the subordinate apparatus 40 and related to the anomaly detection method and certificate transmission method of the present invention.

In these flowcharts, it should be noted that processing for the case the superordinate apparatus requests communication to the subordinate apparatus 40 is represented. For the sake of simplicity of explanation, only the part in which the superordinate apparatus 30 authenticates the subordinate apparatus 40 by using the public key certificate received from the subordinate apparatus 40 (the processing of single-direction authentication shown in FIG. 21) is explained, while it is of course possible to carry out bidirectional authentication shown in FIG. 19 in which the superordinate apparatus 30 transmits a public key certificate to the subordinate apparatus 40.

In the case of transmitting request or notification to the subordinate apparatus 40 or sending communicating request for receiving request or notification from the subordinate apparatus 40, the superordinate apparatus 30 initiates the processing shown in the flowchart of FIG. 10 and transmits a communication request in the step S101 to the normal URL of the subordinate apparatus 40. Here, it is assumed that the superordinate apparatus 30 holds the normal URL and the rescue URL for all of the apparatuses that can become the communication partner.

Upon reception of the communication request, the subordinate apparatus 40 initiates the processing shown in the flowchart of FIG. 11 and judges in the step S201 whether the URL to which the communication request has been made is a normal URL or rescue URL.

In the case it is a communication request to the normal URL, the process proceeds to the step S202 and judgment is made whether or not the individualized certificate is stored.

Normally, there should be an individualized key certificate (individualized public key certificate of the subordinate apparatus) should exist, but there can be a case this is erroneously erased at the time of updating or the individualized public key certificate is not memorized at the time of shipping the product. In such a case, the result of this judgment becomes NO.

In the case it is determined that the individualized key certificate exits in the step S202, the individualized public key certificate is transmitted to the superordinate apparatus 30 together with a first random number encrypted by the individualized private key (individualized private key of the subordinate apparatus) in the step S203. This processing corresponds to the processing of the steps S21 and S22 of FIG. 19 or FIG. 21.

When it is determined in the step S202 that the individualized public key certificate does not exist, the step S211 is conducted in which a response indicative of transmission of the individualized certificate is not possible. With this, the processing is terminated.

When any of these responses has been received or a predetermined time has elapsed, the superordinate apparatus 30 proceeds to the step S102 and determination is made whether or not the subordinate apparatus has transmitted the public key certificate.

When there has been such a transmission, the process proceeds to the step S103 and the authentication processing is carried out.

Here, the authentication is carried out by using the individualized root key certificate for authenticating a subordinate apparatus. This processing corresponds to the processing of the steps S12 and S13 of FIG. 19 or FIG. 21. Further, the CPU of the superordinate apparatus 30 function s as the first authentication means in the process of the steps S101 through S103.

Further, judgment is made whether or not the authentication has been made successfully in the step S104, and if it has been made successfully, the process proceeds to the step S113 and the seed of the common key is transmitted to the subordinate apparatus 40. Further, in the step S113, a common key is created for the communication to be made thereafter. It should be noted that the foregoing processing corresponds to the processing of the steps S14 through S17 of FIG. 19 or FIG. 21.

In the case the individualized public key certificate has been transmitted in the step S203, the subordinate apparatus waits for this transmission in the step S204 and judges, in the case the seed of the common key has been received, that the authentication by the superordinate apparatus 30 has been made successfully. Thereby, the process proceeds to the step S205 and creation of the common key is made for the communication to be made thereafter. It should be noted that these processing corresponds to the processing of the steps S23 through S26 of FIG. 19 or the steps S25 and S26 of FIG. 21.

After the step S113, the superordinate apparatus 30 transmits a request (command) to the subordinate apparatus 40 in the step S114 together with necessary data and wait for the response in the step S115.

When it is judged in the step S116 whether or not all the requests have been transmitted, and the process returns to the step S114 when there remains a request not yet transmitted. When it is confirmed that all the requests have been transmitted, the process proceeds to the step S117 and the processing is terminated by disconnecting the communication.

After the step S205, the subordinate apparatus 40 judges whether or not the request from the superordinate apparatus 30 has been received in the step S206, and if it has been received, the process proceeds to the step S207 in which the requested processing is carried out. Further, a response is returned to the superordinate apparatus 30.

Further, in the step S208, judgment is made about whether or not there exists information to be notified to the superordinate apparatus 30 such as call or periodic notification, and if yes, the notification is made in the step S209.

Further, in the step S210, judgment is made whether or not the superordinate apparatus 30 has disconnected, and if not, the process returns to the step S206. On the other hand, if the communication has been disconnected, the processing is terminated.

In the case the authentication in the step S104 has failed in the processing of the superordinate apparatus 30, this may be caused by various reasons such as: (a) the version of the public key certificate is not compatible with the root key certificate; (b) the public key certificate has expired; (c) the public key certificate has been damaged; (d) irrelevant apparatus has been chosen for the communication partner; (e) wrong identification information was attached to the public key certificate, and the like.

Thus, in the next step S105, examination is made whether the failure of authentication has been caused as a result of using wrong identification information indicating an apparatus inappropriate for the communication partner. If the result of this judgment is YES, the processing is terminated.

Further, it should be noted that there can be other situations in which termination of processing at this moment is deemed appropriate. For example, in the case no response was obtained at all to the communicating request in the step S101 or a response indicating that authentication processing cannot be attended, there is a possibility that the communication partner is an apparatus irrelevant to the superordinate apparatus 30. Thus, in such a case, it is possible to terminate the processing at the moment of the step S105.

It should be noted that the processing after the step S106 is the processing of exploring the cause of failed authentication carried out by using the individualized public key certificate and storing an appropriate digital certificate in the communication partner according to the needs. If the failure of authentication in the step S104 has been caused by inappropriate identification information, it is obvious that the certificate or the process of authentication has been proper, and there is no need of further confirmation. Further, there is no improvement of situation with updating of the certificate, and thus, there is no need for the processing after the step S106 under such a situation. In this case, it is preferable to suppress transmitting a request of communication to the URL to which the communication request has been transmitted in the step S101.

In the case the judgment of the step S105 is NO, this means that the failure of authentication has been made because of the use of inappropriate public key certificate, and thus, the process proceeds to the step S106 for exploration of the cause of the failure. The same applies also in the case the subordinate apparatus 40 has not transmitted the public key certificate in the step S102.

In the step S106, in which it is already known that communicating is not possible with the normal URL, a communication request is now transmitted to the rescue URL of the subordinate apparatus 40.

In this case, the subordinate apparatus 40 restarts the processing shown in the flowchart of FIG. 11, wherein the judgment of the step S201 becomes the rescue URL. The process then proceeds to the step S212 and the common public key certificate for the subordinate apparatus is transmitted to the superordinate apparatus together with the first random number encrypted by the public private key (common private key for subordinate apparatus). It should be noted that this step, too, corresponds to the processing of the steps S21 and S22 of FIG. 19 or FIG. 21, similarly to the case of the step S203.

Because the common public key certificate is not updated after it is stored in the apparatus at the time of manufacturing of the apparatus, contrary to the individualized public key certificate, any apparatus suitable for the subordinate apparatus 40 should store a suitable certificate. This does not hold when the memory means has been damaged. In such a case, the memory means may be replaced with a component storing the same common public key certificate. Because the common public key certificate does not change depending on the apparatuses, preparation of such a replacement component can be made easily.

In the step S107, the superordinate apparatus 30 receives the certificate and the random number that the subordinate apparatus 40 has transmitted in the step S212, wherein the superordinate apparatus 30 carries out authentication by using the same. In this authentication, the common root key certificate for authentication of the subordinate apparatus is used, and the processing corresponding to the steps S12 and S13 of FIG. 19 or 21 is carried out similarly to the case of the steps S102 and S103. In the case no reception is made within a predetermined time after the step S106, this case may be treated as the failure of authentication. Further, the CPU of the superordinate apparatus 30 functions as the second authentication means in the steps S106 and S107.

Further, judgment is made in the steep S108 whether the authentication has been successful, and if YES, the process proceeds to the step S109 and the seed of the common key is transmitted to the subordinate apparatus 40 and a common key is created for the communication to be made thereafter. It should be noted that the foregoing process corresponds to the steps S14 through S17 of FIG. 19 or FIG. 21, similarly to the case of the steps S104 and S114.

After the step S212, the subordinate apparatus 40 waits for the foregoing transmission in the step S213 and judges that authentication by the superordinate apparatus 30 is made successfully when it has received the seed of the common key. Thereby, the process proceeds to the step S214 and creation of the common key is made for the communication to be made thereafter. It should be noted that the foregoing processing corresponds to the processing of the steps S23 through S25 of FIG. 19 or the steps S25 and S26 of FIG. 21, similarly to the case of the steps S204 and S205.

Upon success of authentication in the step S108 by using the common public key certificate, the superordinate apparatus 30 determines that the there should have existed anomaly in the authentication made by using the individualized key certificate with respect to the subordinate apparatus 40. In the processing of the step S108, the CPU of the superordinate apparatus 30 functions also as the anomaly detection means.

Thus, processing is made in the step S110 following the step S109 for updating the certificate of the subordinate apparatus 40 by causing the certificate managing apparatus 20 to crease a new certificate set for updating by transmitting thereto necessary information. Details of this processing will be explained later.

Upon acquisition of the new certificate set thus created from the certificate managing apparatus 20, the superordinate apparatus 30 transmits in the step S111 the new certificate set to the subordinate apparatus 40 together with a request for updating the certificate and requests updating of the regular authentication information stored therein (or not-existed) to the content of the new certificate set. In this processing, the CPU of the superordinate apparatus 30 functions as the individualized certificate transmission means.

Next, in the step S112, the response from the subordinate apparatus 40 is waited and the communicating is disconnected by proceeding to the step S117. Thereby the processing is terminated.

With regard to the requests, and the like, which the superordinate apparatus 30 has intended to transmit at the beginning, these can be transmitted this time by restarting the processing. On the other hand, because the authentication by the individualized public key certificate has become already available by this time, it is also possible to proceed from the step S104 to the step S113 and cause the subordinate apparatus 40 to carry out the related processing by sending the communication request to the subordinate apparatus 40 in the processing thereafter.

After the step S214, the subordinate apparatus 40 waits for the incoming of the request in the step S215 and the process proceeds to the step S216 upon reception of the request.

As request management part 44 permits only the updating of the certificate of the subordinate apparatus 40 in the case the authentication has been made by using the common public key certificate as explained with reference to FIG. 4, discrimination is made in the step S216 whether or not the received request is a request of updating the certificate.

If the request is note the request for updating the certificate, the request is ignored and the process is returned to the step S215 for waiting for incoming of the request. It is also possible to return a response indicating that the transmitted request is not acceptable.

On the other hand, when it is judged in the step S216 that the request is a request for updating the certificate, the process proceeds to the step S217 and stores the new certificate set received together with the request for updating the certificate in the certificate memory part 45. Thereby, the content of the regular authentication information shown in FIG. 5A is updated according to the content of the new certificate set. Further, the result of the updating is notified to the transmission source in the step S218 as a response and processing is terminated.

Next, the example of the processing sequence carried out by the superordinate apparatus 30 and the subordinate apparatus 40 executing the processing shown in FIGS. 10 and 11 will be explained including the processing in the certificate managing apparatus 20.

Figure 12:
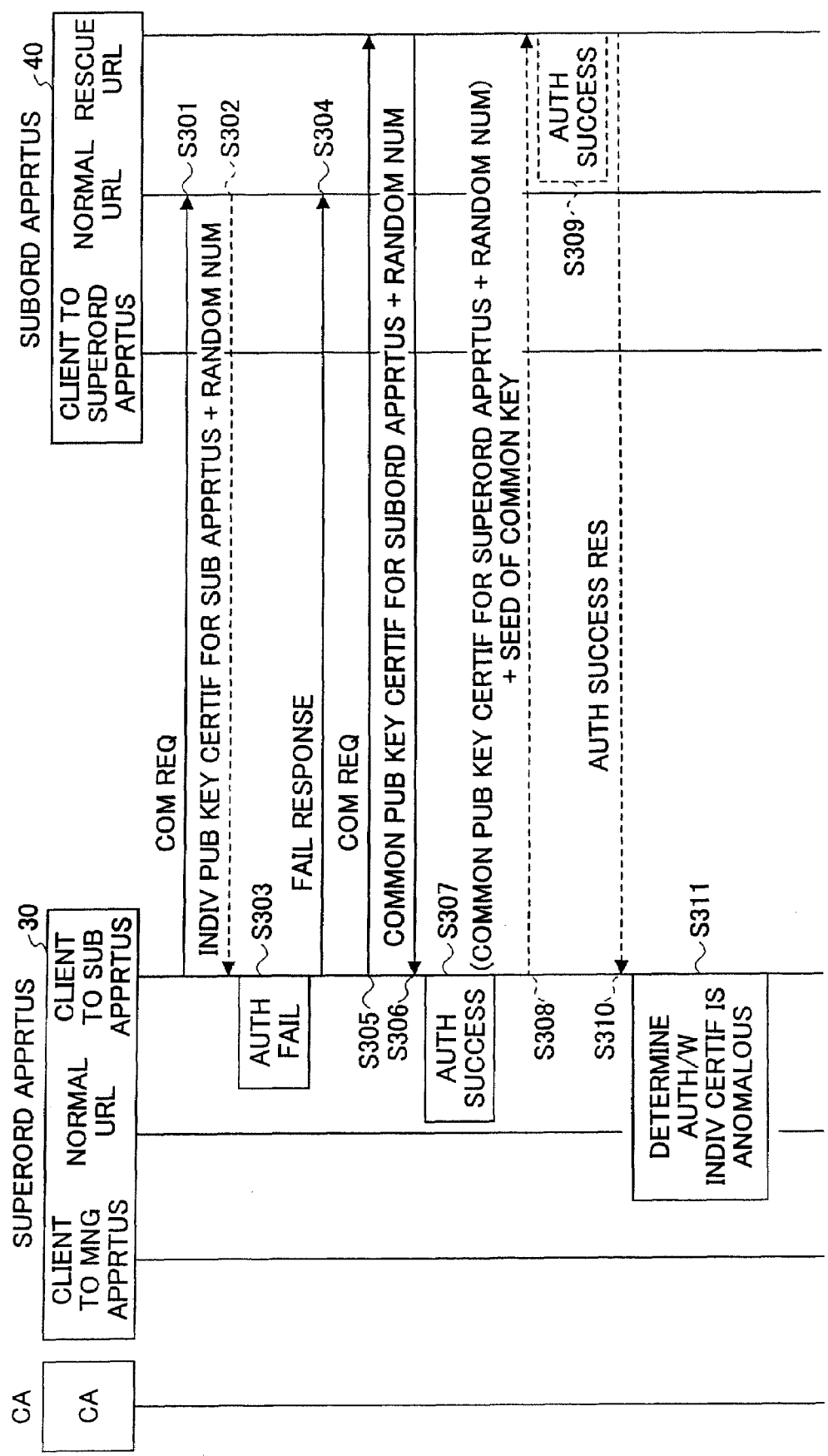
FIGS. 12 and 13 are diagrams showing the process sequence for the case the processing of FIGS. 10 and 11 is carried out in the communication system of the present invention.
Figure 13:
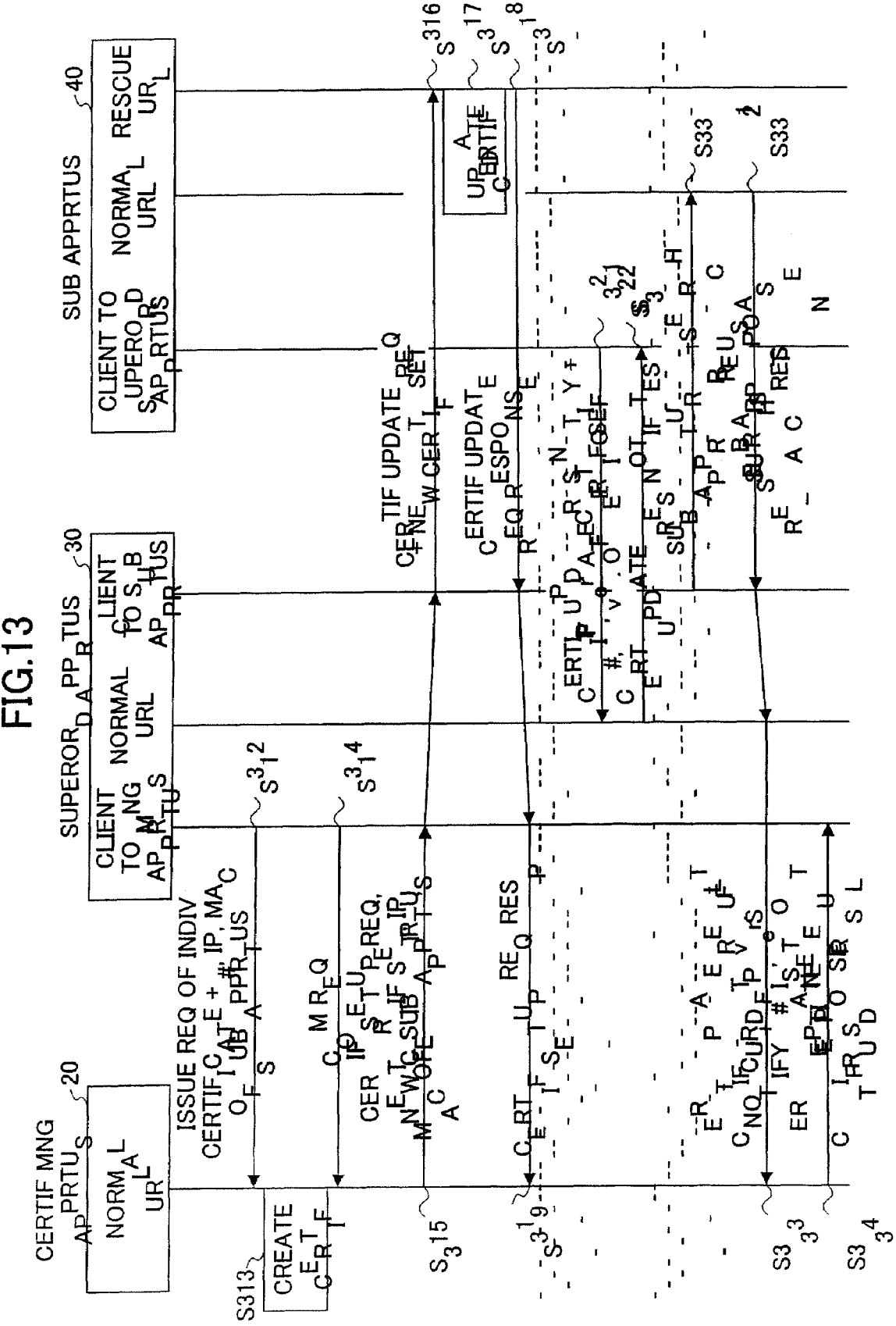

FIGS. 12 and 13 show this processing sequence.

It should be noted that the illustrated example corresponds to the situation in which the version of the individualized public key certificate stored in the subordinate apparatus 40 is outdated and validity thereof can no longer confirmed by using the individualized root key certificate for authentication of the subordinate apparatus stored in the superordinate apparatus 30.

In this example, the superordinate apparatus 30 first causes the HTTPS client function part 31 to function as the client with regard to the subordinate apparatus and transmits the communication request to the normal URL of the subordinate apparatus 40 (S301).

In this case, the HTTPS server function part 42 of the subordinate apparatus 40 receives the request and the HTTPS server function part 42 notifies this request to the authentication processing part 43. Further, with this, the subordinate apparatus 40 is requested the authentication by using the individualized certificate.

Thus, the certificate processing part 43 returns the individualized public key certificate for the subordinate apparatus stored in the certificate memory part 45 to the superordinate apparatus 30 together with a random number encrypted by the individualized private key stored in the certificate memory part 45 (S302).

Thereby, the superordinate apparatus 30 delivers this to the authentication processing part for authentication. Because the version of the received individualized public key certificate for the subordinate apparatus is different from the version of the individualized root key certificate for the subordinate apparatus stored in the certificate memory part 35, confirmation of validity is not achieved by using this root key certificate, and thus, it is decided that the authentication has failed (S303) and a response indicative of failure of authentication is returned to the subordinate apparatus 40 (S304). At this moment, however, it is not yet certain for the superordinate apparatus 30 whether the partner requested the communication is duly the subordinate apparatus 40.

Now, because the failure of authentication has been caused by the failure of confirming validity of the public key certificate, a communicating request is transmitted to the rescue URL (S305) in order to investigate whether or not the apparatus of the normal URL that has requested the communication is an apparatus appropriate for the communication partner.

In the side of the subordinate apparatus 40, this request is notified to the authentication processing part 43 similarly to the case of the step S301. This time, the subordinate apparatus 40 is requested for the authentication by using the common certificate.

Thus, the authentication processing part 43 returns the common public key certificate for the subordinate apparatus held in the certificate memory part 45 to the superordinate apparatus (S306) together with the random number encrypted according to the SSL protocol by the common private key for the subordinate apparatus held in the certificate memory part 45.

Then, the superordinate apparatus 30 carries out the authentication processing by delivering this to the authentication processing part 33, wherein it is judged that the authentication is made successfully in view of the fact that the subordinate apparatus 40 is an apparatus that can become a proper communication partner of the superordinate apparatus 30 and the validity of the common public key certificate for the subordinate apparatus can be confirmed by using the root key certificate for authentication of the subordinate apparatus held in the superordinate apparatus 30 and further in view of the fact that the decrypting of the random number is achieved without problem (S307).

Further, the superordinate apparatus 30 returns the seed of the common key encrypted by the public key included in the common public key certificate for the subordinate apparatus to the rescue URL of the subordinate apparatus 40 in the case of the single-direction authentication (S308).

In the case of carrying out the mutual authentication, a second random number is encrypted by using the common private key for the superordinate apparatus held in the certificate memory part 35 and returns the same together with the common public key certificate for the superordinate apparatus.

The subordinate apparatus 40 delivers the same to the authentication processing part 43 and decrypts the seed of the common key by using the common private key for the subordinate apparatus.

In the case of the mutual authentication, the validity of the common public key certificate for the superordinate apparatus is confirmed by using the root key certificate for authentication of the superordinate apparatus, and the authentication processing is carried out by decrypting the second random number by using the public key included therein.

Because the foregoing authentication processing is carried out properly, it is determined that the authentication has been made successful (S309), and a response is returned to the superordinate apparatus 30 indicating that the authentication has been made successfully (S310). Thereafter, the superordinate apparatus 30 and the subordinate apparatus 40 create the common key by using the seed of the common key received in the step S308 (illustration omitted).

Upon reception of the response of the step S310, the superordinate apparatus 30 knows that the partner that has requested communication in the step S301 is an apparatus that can become a valid communication partner and that there exist no particular anomaly in the process of communication or authentication processing. Further, it is already known in the step S303 that the failure of authentication has been caused not by the anomaly of communication but failure of confirming validity of the individualized common key certificate received from the subordinate apparatus 40. Thus, it is judged that the failure of the authentication using the individualized public key certificate has been caused by the anomaly occurring in the authentication as a result of anomaly of the certificate that is stored in the subordinate apparatus 40 (S311). In other words, it is judged that, because the apparatus is the one that should provide successful authentication by using the individualized public key certificate, the failure of authentication must have been caused by the anomaly of the certificate (or certificate is not stored).

Thus, the process proceeds to the steps following FIG. 13, and the HTTPS client function part 31 is used as the client for the CA. Thereby, the HTTPS client function part 31 transmits the machine number, IP address and MAC address of the subordinate apparatus 40 to the certificate managing apparatus 20 together with the request for issue of individualized certificate and requests the creation of a new certificate set for the subordinate apparatus 40.

Here, the information transmitted to the certificate managing apparatus 20 may be stored in the superordinate apparatus 30 in advance as the information of the communication partner, or may be acquired after the success of authentication by using the public key certificate, by causing the subordinate apparatus 40 to transmit the same.

While the certificate set includes each of the certificates and the private key shown in FIG. 9, it should be noted that the individualized root key certificate for the superordinate apparatus is not necessary in the case of carrying out the single-direction authentication.

Further, while not illustrated, it is assumed that the transmission of requests is made also between the superordinate apparatus 30 and the certificate managing apparatus 20 after a safe communication route is established by carrying out the authentication processing according to the SSL protocol by using the individualized certificate, similarly to the case of the communication between the superordinate apparatus 30 and the subordinate apparatus 40.

Upon reception of the request of the step S312, the certificate managing part 20 creates the certificate set and the setup request thereof (S313). Thereby, because the certificate managing apparatus 20 manages the version of the individualized root key certificate for authentication of the subordinate apparatuses, which is held in the superordinate apparatus 30, it becomes possible to create with this root key certificate an individualized public key certificate including the machine number as the identification information of the subordinate apparatus 40, by adding thereto a digital signature enabling confirmation of validity.

In this case, it is possible to confirm in the certificate managing apparatus 30 that the destination of the individualized public key certificate is an appropriate apparatus by comparing the machine number, IP address and MAC address received from the superordinate apparatus 30 with the information held by the certificate managing apparatus 20.

Because the certificate managing apparatus 20 stores also the public key and the private key issued for the subordinate apparatus 40, it is also possible to create a new certificate without changing the key itself and merely changing the digital signature.

Further, because the certificate managing apparatus 20 manages the version of the digital signature attached to the individualized public key certificate for the superordinate apparatus, it is possible to create an individualized root key certificate for the superordinate apparatus that enables confirmation of validity of this digital certificate.

Here it should be noted that it is possible to carry out the updating of the root key certificate at the same time by newly creating the route private key used for digital signature, as noted previously.

Here, each of the new certificates and the keys thus created are managed by storing in the certificate managing part 26.

After transmitting the request of the step S312, the superordinate apparatus 30 requests communication to the certification managing part 20 with the timing chosen such that the creation of the certificate has been completed, and inquires whether or not there has been a communication request from the certificate managing apparatus 20 to the superordinate apparatus 20 (S314).

When the processing of the step S313 is completed by this time, the certificate managing apparatus 20 returns to the superordinate apparatus 30 the new certificate set and the IP address and the MAC address of the subordinate apparatus 40, in which the new certificate is going to be stored, as the response to the communication request, together with the request for setting up the certificate (S315). Thereby, the superordinate apparatus 30 can acquire the new certificate set to be stored in the subordinate apparatus together with the request for setting up the certificate.

Upon reception of this request, the superordinate apparatus transmits the new certificate set to the rescue URL of the indicated IP address together with the certificate updating request (S316).

In this case, it is possible to acquire the MAC address first from the source of transmission and transmit the new certificate set after confirming that the MAC address agrees with the MAC address described in the certificate setup request.

Meanwhile, the subordinate apparatus 20 notifies the received request for updating the certificate from the HTTPS server function part 42 to the request managing part 44, and the request managing part 44 causes the certificate updating part 48 to carry out the certificate updating processing. Thereby, the regular authentication information stored in the certificate memory part 45 is updated to the content of the new certificate set (S317).

Further, the response to the certificate updating request indicating the result of the updating is returned to the superordinate apparatus 30 (S318), and the superordinate apparatus 30 returns a response to the certificate setup request to the certificate managing apparatus 20 based on the foregoing response (S319). With this, the processing is completed for the moment.

Here, it is preferable to disconnect the communication between the superordinate apparatus 30 and the subordinate apparatus 40 once after the step S310 and carry out the authentication at the time of the transmission of the step S316 by newly transmitting the communication request to the rescue URL.

The processing thereafter is omitted in the flowchart of FIG. 10 and FIG. 11. After the foregoing updating of the certificate is completed, the subordinate apparatus 40 causes the HTTPS client function part 41 as the client with regard to the superordinate apparatus, and transmits the communication request to the normal URL of the superordinate apparatus 30.

Thereby, the machine number, the IP address and the version information of the certificate set after the updating are notified together with certificate updating result notification notifying the result of the updating processing (S321). The superordinate apparatus then reruns a response to this notification (S322). During this communication, the authentication that uses the individualized public key information is conducted. By using the certificate included in the new certificate set, this authentication can be achieved without problems.

Further, the superordinate apparatus 30 transmits, upon reception of the notification of the setup S321, the communication request to the normal URL of the subordinate apparatus and carries out the search of the subordinate apparatus 40 again (S331). It should be noted that this is made to confirm that the authentication using the individualized certificate is made successfully and the communication can be achieved normally also for the case the communication is requested from the side of the superordinate apparatus 30. The subordinate apparatus 40 returns a response to this (S332).

Upon reception of this response, the superordinate apparatus 30 can confirm that the updating of the certificate is made successfully and that the anomaly of authentication using the individualized certificate is resolved as a result.

Thus, the superordinate apparatus 20 notifies that the updating has been made successfully by transmitting the certificate updating result notification and the associated information thereof received in the step S321 to the certificate managing apparatus 20 (S333). Thereby, the certificate managing apparatus 20 returns a response thereto (S334).

Thus, in the communication system shown in FIGS. 1 and 2, normal authentication is restored by updating the certificate of the subordinate apparatus according to the procedures explained heretofore in the event the authentication has failed due to disagreement of the version of the certificate constituting the regular authentication information between the subordinate apparatus 40 and the subordinate apparatus 30.

Further, as a result of the processing carried by the superordinate apparatus 30 and the subordinate apparatus 40, it becomes possible to carry out the authentication using the individualized public key certificate in the ordinary case of requesting communication such that the authentication is made by identifying the communication partner and establishing a same communication according to SSL, and carry out the authentication that uses the common public key certificate in the event the authentication using the individualized public key certificate has failed. Thereby, it becomes possible to identify, in the event the authentication by using the common public key certificate has been made successfully, that the cause of failure of the authentication by using the individualized public key certificate is the anomaly of the authentication. Thereby, it becomes possible to take action immediately to resolve the anomaly.

Further, in the case the authentication by using the common public key certificate alone has been made successfully, this indicates that there exists anomaly in the regular authentication information held in the subordinate apparatus 40 such as individualized public key certificate for the subordinate apparatus, and thus, it becomes possible to resolve the anomaly promptly in such a case by causing the superordinate apparatus 30 to acquire a new certificate set and transmit the same to the subordinate apparatus 40 for updating of the regular authentication information.

Further, because the transmission of the new certificate set can be transmitted after confirmation that the destination of transmission is an apparatus suitable for communication partner as a result of the authentication that uses the common public key certificate. Thus, the possibility of storing the certificate set in an inappropriate apparatus is eliminated.

In the case of carrying out the mutual authentication, the subordinate apparatus 40 can also receive the new certificate set after confirming that the transmission source of the new certificate set is the superordinate apparatus 30. Thus, the possibility of storing wrong certificate for the regular authentication information is eliminated. Further, because the authentication by using the common public key certificate is possible also in the case the authentication by using the individualized public key certificate is not possible, the new certificate set can be transmitted via a safe communication route by using SSL, and the possibility of the content of the new certificate set being leaked to a third party is eliminated. Thereby, the required security is maintained.

Further, because the subordinate apparatus 40 can be configures so as not to accept the request from the communication partner authenticated by using the common public key certificate except for the updating request of the certificate, the access to the subordinate apparatus 40 is allowed for only the communication partners that has been authenticated by using the individualized public key certificate with regard to the information other than the updating request of the certificate. Thereby, illegal access to important information is eliminated even in the case the communication partner is not identified as a result of use of the common public key certificate.

Modification of Embodiment

FIGS. 14-17

Next, various modifications of the embodiment noted above will be explained.

Heretofore, explanation has been made for the example of updating the regular authentication information of the subordinate apparatus 40 in the event the authentication by using the individualized certificate has failed and the authentication by using the common certificate has been made successfully.

The reason that the regular authentication information of the subordinate apparatus 40 is updated in the foregoing embodiment is that the subordinate apparatus 40 can be included in plural numbers in the communication system of the present embodiment in such a manner that the plural subordinate apparatuses 40 is connected to a single superordinate apparatus 30. Further, the subordinate apparatus 40 may be connected detachably. Thereby, managing of the subordinate apparatus becomes complex and there is a tendency that anomaly caused by inconsistent version number occurs more in the subordinate apparatus 40. Further, there can occur problems in the authentication of the subordinate apparatuses other than the subordinate apparatus 40 authenticated by the common certificate once the regular authentication information of the superordinate apparatus 30 is updated.

On the hand, there can be a case that the regular authentication information includes anomaly. Thus, in the case the anomaly of authentication is not resolved even in the case the regular authentication information of the subordinate apparatus 40 is updated, it may be worthwhile for the superordinate apparatus 30 to attempt updating the own regular authentication information. Further, in the case the superordinate apparatus 30 has detected anomaly in the own regular authentication information, it is preferable that the superordinate apparatus 30 attempts updating of the own regular authentication information from the beginning.

Figure 14:
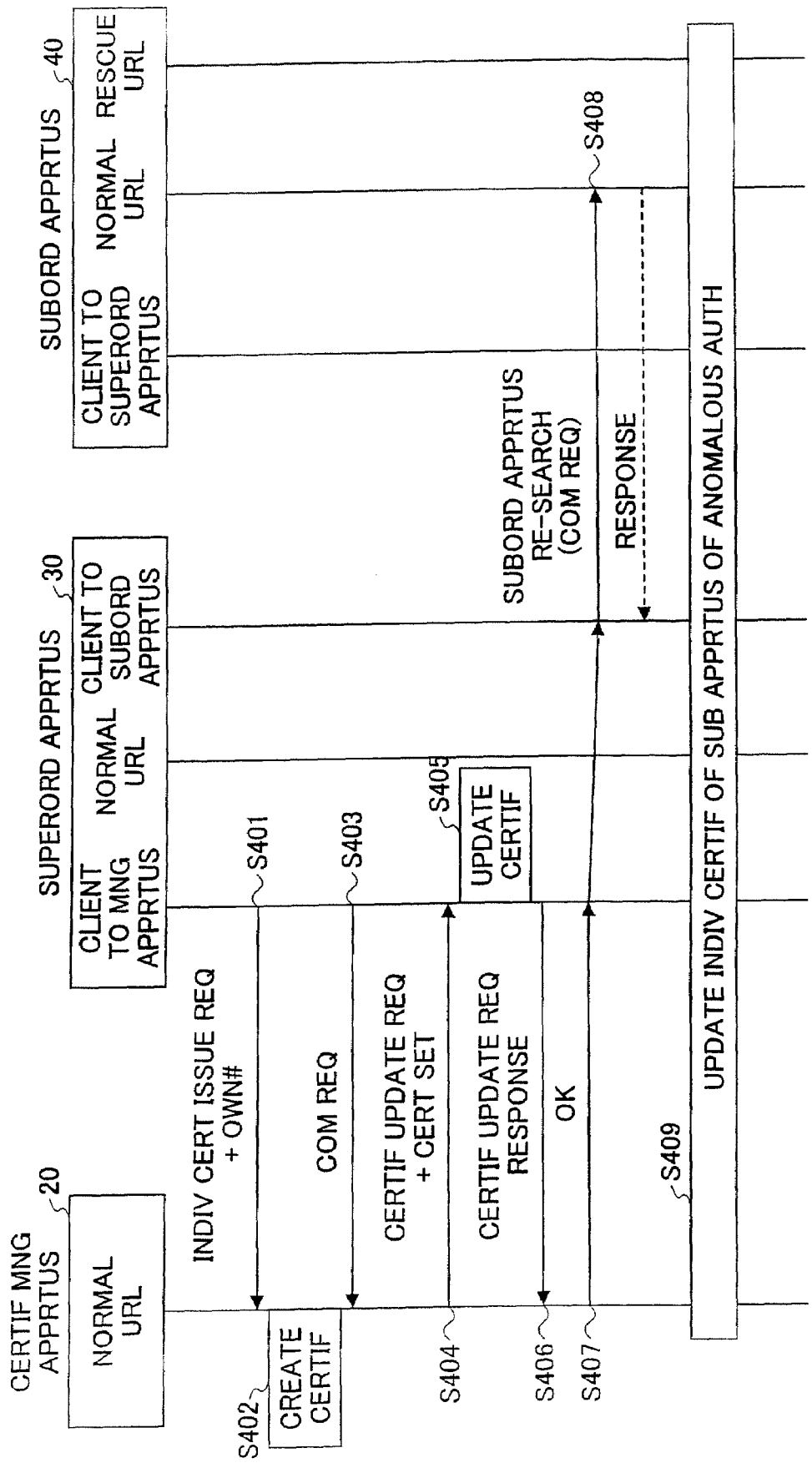
FIG. 14 is a diagram showing an example of the process sequence for the case of the superordinate apparatus updating the regular authentication information of itself in the communication system of the present invention.

FIG. 14 shows an example of process sequence for this case.

In this case, the superordinate apparatus 30 causes the HTTPS client function part 31 as the client for the CA and request creation of a new certificate set for the superordinate apparatus 30 by transmitting an individualized certificate issue request and the own machine number information to the certificate managing apparatus 20 (S401).

In this case too, an authentication processing according to the SSL protocol is carried out by using the individualized certificate and the request and the like are transmitted after a safe communication route is established.

On the other hand, in view of existence of anomaly in the regular authentication information of the superordinate apparatus 30, there can also be a case in which such authentication is not performed properly.

In such a case, the superordinate apparatus 30 accesses to the rescue URL of the certificate managing apparatus 20 in such a case and achieve the authentication by using the common certificate. Illustration of this process is omitted.

Upon reception of the request of the step S401, the certificate managing apparatus 20 creates a certificate set and a setup request thereof (S402).

Because the certificate managing apparatus 20 holds all the public key and private key issued in the past to the superordinate apparatus 30 or the route private key and the root key of all the versions used in the past, the certificate managing part 20 can create the certificate of any version. Nevertheless, it is preferable that the certificate managing part 20 creates the certificate of the latest version for this purpose. Thereby, the newly created certificates and the keys are managed by storing the same in the certificate managing part 26, similarly to the certificate and the like of the past.

After transmitting the request of the step S401, the superordinate apparatus 30 requests communication to the certificate managing apparatus 20 with a timing chosen such that the creation of the certificate has been completed, and inquires whether or not there is a request from the certificate managing apparatus 20 to the superordinate apparatus 30 (S403). When the processing of the step S402 has been completed by this time, the certificate managing apparatus 20 returns the new certificate set to the superordinate apparatus 30 together with the certificate setup request as the response to the communication request (S404).

Upon reception of this request, the superordinate apparatus 30 updates the regular authentication information held in the certificate memory part 45 according to the content of the new certificate set thus received (S405), and returns a certificate update request response indicative of the result of the updating processing to the certificate managing apparatus 20 (S406). Then the certificate managing apparatus 20 returns a notification indicative of reception of the response (S407).

With the processing above, it becomes possible to update the regular authentication information of the superordinate apparatus 30 similarly to the case of the subordinate apparatus 40.

On the other hand, such updating, causing a change of individualized certificate in the superordinate apparatus 30, may result in a situation in that the authentication, carried out successfully between the superordinate apparatus 30 and the subordinate apparatus 40 before the updating, can no longer achieved properly.

Thus, the superordinate apparatus requests communication to the normal URL of each subordinate apparatus 40 for re-searching of the subordinate apparatus (S408). Then, the superordinate apparatus 30 carries out the authentication by using the individualized certificate transmitted from the subordinate apparatuses 40 as a response, and updating of the regular authentication information including the individualized certificate is achieved for those subordinate apparatuses 40 in which the authentication has failed, by carrying out the steps similar to the step S305 and the steps thereafter of FIGS. 12 and 13 (S409).

Upon completion of the search and updating for all of the subordinate apparatuses 40, the superordinate apparatus 30 restores the state capable of carrying out authentication for all of the subordinate apparatuses by using the individualized certificate. Thus, by carrying out such processing, it becomes possible to eliminate anomaly in the authentication carried out by using the individualized certificate, even in the case the anomaly has been caused by the anomaly existing in the regular authentication information of the superordinate apparatus 30.

It should be noted that the re-searching shown in the step S408 and the steps thereafter of FIG. 13 can be achieved irrespective of the updating of the certificate of the superordinate apparatus 30.

As a result of such a processing, confirmation is made periodically with regard to the success of the authentication by using the individualized certificate and update the individualized certificate of the subordinate apparatus 40 in the case anomaly has been detected. Thereby, it becomes possible to maintain the state in which each apparatus forming a communication system can authenticate a communication partner by using an individualized certificate.

Further, by carrying out this re-searching for not only the IP addresses held as a potential communication partner but for a predetermined IP address range, it becomes possible to detect the connection of a new subordinate apparatus automatically and realize the state in which authentication by using an individualized certificate is possible. Further, even in the case the subordinate apparatus 40 has not been given the individualized certificate at the time of manufacture, it becomes possible to urge the certificate managing apparatus 20 to issue an individualized certificate for that subordinate apparatus once the authentication by using the common certificate has been made successfully.

Thus, by using such a re-searching process, it becomes also possible to ship an apparatus used for the subordinate apparatus 40 from a manufacturer in the state only the rescue authentication information is stored in the apparatus. Thereby, the regular authentication information is distributed and stored into the apparatus after the apparatus is mounted to the site of the customer and connected to the superordinate apparatus 30 by a network.

Here, it should be noted that the updating (or newly writing) of the individualized certificate is carried out immediately when an apparatus, in which there exists anomaly in the authentication carried out by the individualized certificate as a result of this re-searching, has been discovered. Such a re-searching can be regarded as a part of the operation of storing a new individualized certificate into a subordinate apparatus 40.

Further, in the embodiments noted above, explanation has been made for the example of the communication request made from the superordinate apparatus 30 to the subordinate apparatus 40, while the present invention is not limited to such a specific configuration. Thus, a similar processing is possible also in the case communication is made from the subordinate apparatus 40 to the superordinate apparatus 30.

Figure 15:
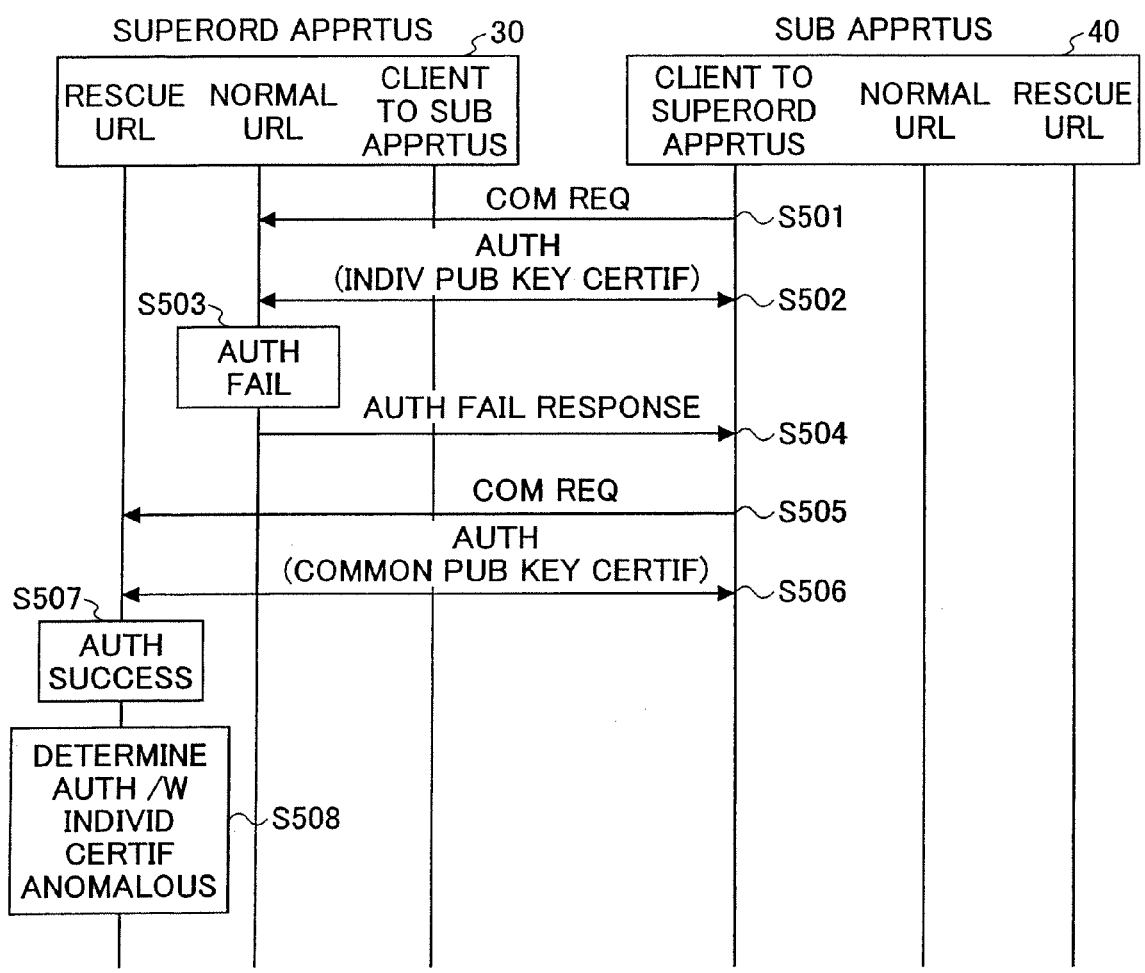
FIG. 15 is a diagram showing a modification of the process sequence shown in FIG. 12 with simplification.
Figure 16:
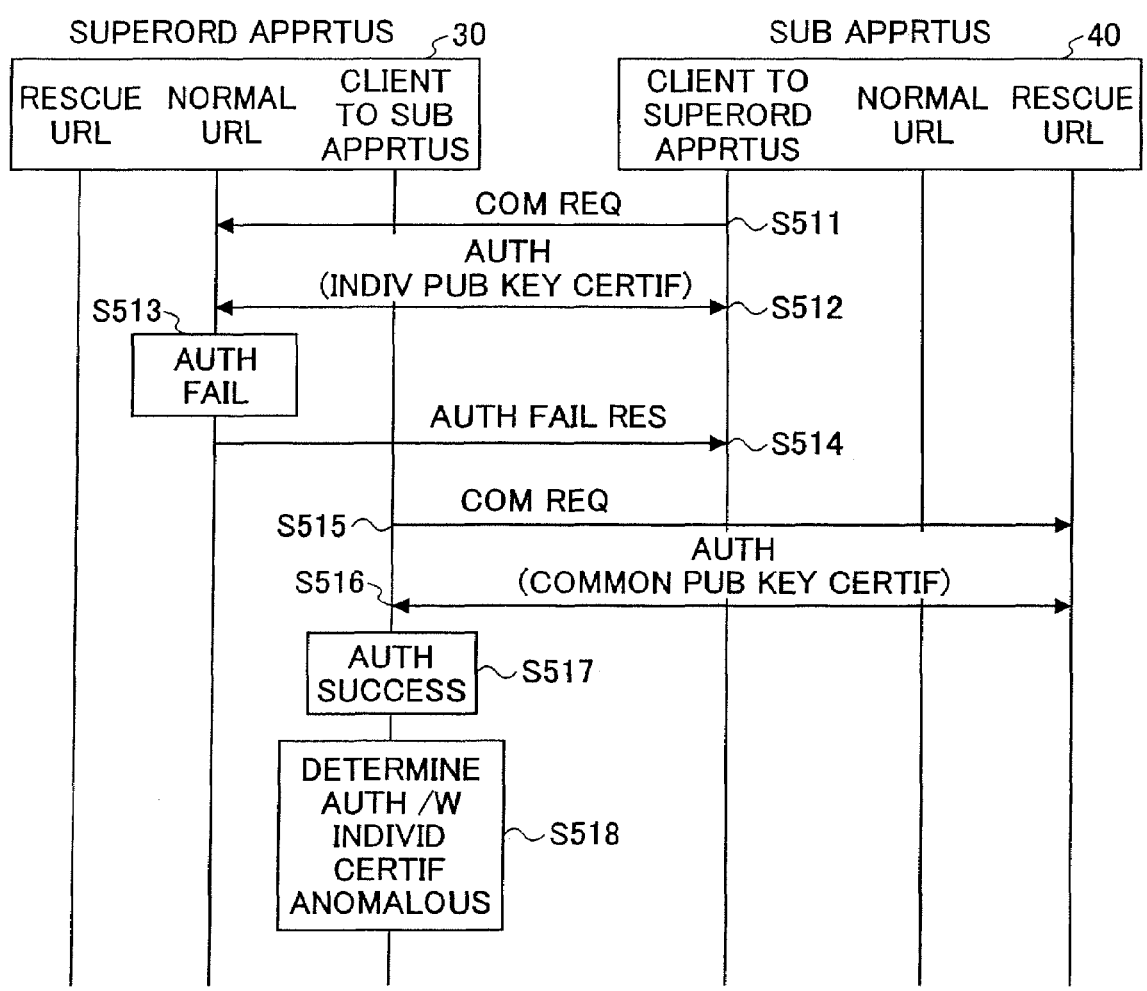
FIG. 16 is a diagram showing a further modification of FIG. 15.
Figure 17:
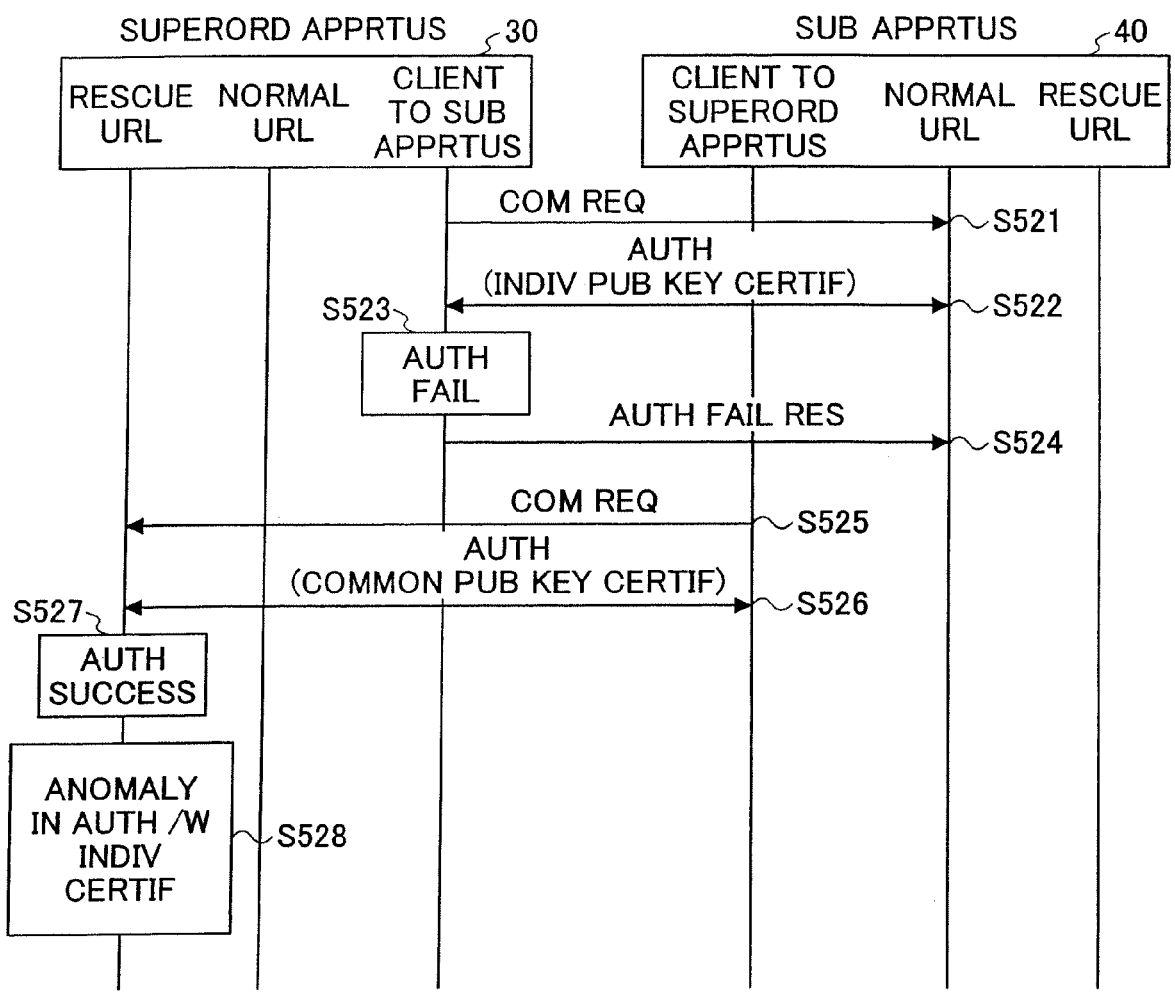
FIG. 17 is a diagram showing a further modification of FIG. 16.

FIGS. 15 through 17 show the process sequence corresponding to such a case for the part corresponding to the process sequence of FIG. 12. In the drawings, it should be noted that the process sequence is simplified as compared with the case of FIG. 12.

FIG. 15 shows an example of the subordinate apparatus 40 requesting communication to the superordinate apparatus 30 for the case of carrying out authentication by using the individualized public key certificate and also for the case of carrying out the authentication by using the common public key certificate.

Referring to FIG. 15, the subordinate apparatus 40 requests communication to the normal URL of the superordinate apparatus for normal communication (S501), and there is carried out an authentication processing using the individualized public key certificate between the superordinate apparatus 30 and the subordinate apparatus 40 in response thereto (S502).

While this authentication processing may be any of the mutual authentication shown in FIG. 19 or single-direction authentication, it is assumed herein that there is included at least the processing in which the superordinate apparatus 30 authenticates the subordinate apparatus 40 by using the public key certificate of the subordinate apparatus 40. Because the subordinate apparatus 40 acts as a client in this example, the processing for the single-direction authentication becomes slightly different from the one shown in FIG. 21. However, the same processing is used with regard to the feature that the subordinate apparatus 40 transmits a random number to the superordinate apparatus with encryption by using the own private key together with the public key certificate and that the superordinate apparatus 30 confirms the validity of the public key certificate and carries out the authentication by decrypting the random number.

When it is judged in the superordinate apparatus 30 that the authentication in the step S502 has failed (S503), the superordinate apparatus 30 returns an authentication failure response to the subordinate apparatus 40 (S504).

Then the subordinate apparatus 40 thus received the response requests communication to the rescue URL of the superordinate apparatus 30 (S505), and the authentication processing using the common public key certificate is carried out (S506).

When it is judged in the superordinate apparatus 30 that the authentication has been made successfully (S507), it is determined that the failure of authentication using the individualized public key certificate has been caused because there has been caused anomaly in the authentication due to the anomaly of the certificate stored in the subordinate apparatus 40 (S508). Thereby, the processing of FIG. 13 is carried out and the regular authentication information of the subordinate apparatus 40 is updated.

FIG. 16 shows the example of the subordinate apparatus 40 requesting communication to the superordinate apparatus 30 when carrying out the authentication by using the individualized public key certificate and the superordinate apparatus 30 requesting communication to the subordinate apparatus 40 when carrying out the authentication by using the common public key certificate.

In this case, the processing from the step S511 to the step S514 is the same as in the case of the steps S501-S504 of FIG. 15, except that the superordinate apparatus 30 requests communication to the rescue URL of the subordinate apparatus 40 when the subordinate apparatus 40 has returned the authentication failure response (S515).

Further, an authentication processing using the common public key certificate is carried out (S516), and when it has been determined that the authentication has been made successfully (S517), it is determined that the failure of the authentication using the individualized public key certificate has been caused because of the anomaly of authentication due to the existence of anomaly in the certificate held by the subordinate apparatus similarly to the step S311 (S518).

Then, the processing shown in FIG. 13 is carried out and the regular authentication information of the subordinate apparatus 40 is updated.

Further, FIG. 17 shows the example of the superordinate apparatus 30 requesting communication to the subordinate apparatus 40 in the case of carrying out authentication by using the individualized public key certificate and the subordinate apparatus 40 requesting communication to the superordinate apparatus 30 in the case of carrying out authentication by using the common public key certificate.

In this case, the superordinate apparatus 30 requests transmission to the normal URL of the subordinate apparatus 40 for normal communication (S521), and an authentication processing is carried out between the superordinate apparatus 30 and the subordinate apparatus 40 in response thereto by using the individualized public key certificate (S522). The content of authentication may be any of the mutual authentication shown in FIG. 19 or the single-direction authentication shown in FIG. 21.

When it is judged in the superordinate apparatus 30 that the authentication in the step S522 has failed (S523), a certification failure response is transmitted to the subordinate apparatus 40 (S524).

Then, the subordinate apparatus 40 transmits request, upon reception of this response, communication to the rescue URL of the superordinate apparatus 30 (S525), and the authentication processing by using the common public key certificate is carried out (S526).

When it has been determined in the superordinate apparatus 30 that the authentication has been made successfully (S527), it is determined that the failure of the authentication carried out by using the individualized public key certificate has been caused by the anomaly of authentication due to the existence of anomaly in the certificate held by the subordinate apparatus 40 (S528). Then, the processing shown in FIG. 13 is carried out and the regular authentication information of the subordinate apparatus 40 is updated.

In any of the sequences shown in FIGS. 15 through 17, it becomes possible to determine, in the case the authentication by using the individualized public key certificate has failed and the authentication by using the common public key certificate has been made successfully, that the failure of the authentication at the time of using the individualized public key certificate has been caused as a result of anomaly in the authentication. Thus, it becomes possible to resolve the anomaly promptly by causing the superordinate apparatus 30 to acquire a new certificate set and transmit the same to the subordinate apparatus 40 for updating the regular authentication information.

Further, it is possible to change the apparatus that carried out the communication request according to the situation.

For example, it is possible to configure such that the superordinate apparatus 30 transmits the communication request to the rescue URL of the subordinate apparatus 40 in the case the authentication by using the individualized public key certificate has failed, or it is possible to configure such that subordinate apparatus 40 transmits a communication request to the rescue URL of the superordinate apparatus 30 in the case it has received the response indicating that the authentication by using the individualized public key certificate has failed. Thereby, the processing thereafter can be carried out similarly, irrespective of the apparatus that has made the initial communication to the normal URL.

Further, the step S316 of FIG. 13 related to the transmission of the new certificate set can be made also by sending communicating request from the side of the subordinate apparatus 40 and causing the superordinate apparatus 30 to transmit the certificate updating request in response to that communication request.

In the foregoing embodiments, explanation has been made for the example in which there is provided only one certificate managing apparatus 20. However, in view of the fact that the individualized certificate and the common certificate are different with regard to the usage and function, it is preferable that these certificates are issued by different certificate managing apparatuses.

More specifically, the common certificate is not updated once it is created, and thus, the safety of communication is deteriorated severely once the common route private key has been leaked. Thus, there is a need of maintaining secrecy particularly carefully. On the other hand, there is no need of creating and storing different certificates for the respective apparatuses.

Thus, in order to guarantee safety, it is preferable to use a certificate managing apparatus connected to the factory of the vendor carrying out the step of storing the certificate by a dedicated line and otherwise not accessible from outside, for holding the common key certificate.

In the case of the individualized certificate, this can be updated according to the needs. Thus, even in the case there has occurred leakage in the individualized route private key, the safety of communication can be maintained by simply updating the same. In view of the needs of creating and storing a certificate for each of the apparatuses, it is preferable to use a certificate managing apparatus connected to an open network such as internet for storing the individualized certificate.

Further, it is possible to divide the certificate managing apparatus 20 further and provide plural certificate managing apparatuses according to the rank of the apparatuses subjected to issuance of the certificate, such as a certificate managing apparatus for issuing the certificate for the subordinate apparatuses, a certificate managing apparatuses for issuing the certificate for the superordinate apparatuses, a certificate managing apparatus for issuing a certificate of the respective certificate managing apparatuses, and the like.

Further, it should be noted that the certificate transmission method explained in the foregoing embodiment can be used also at the time of writing individual certificates into respective apparatuses when manufacturing the communication apparatus in a factory. Thereby, the tools used for setting up the individualized certificates are used to function as the superordinate apparatus, and the communication apparatuses written with the common certificate in the manufacturing process are used to function as the subordinate apparatus, and authentication of the communication apparatus is made by the tool by using the common certificate. When this has been made successfully. With this, problems such as writing the individualized certificate to wrong product or illegal acquisition of the certificate by false personation of the product can be prevented.

Further, by authenticating the tool also in the side of the communication apparatus by using the common certificate and accepting the individualized certificate only when the authentication has been made successfully, the problem of writing of forged certificate by false personalization of the tool is also prevented.

In the embodiments heretofore, explanation has been made for the case of using the individualized certificate attached with the identification information of apparatus and the common certificate not attached with the identification information of the apparatus. Thereby, the former can be regarded as a certificate having higher security strength and the latter as a certificate of lower security strength.

Generally, a certificate of high security strength tends to need describing of large amount of information, and the use thereof may be limited. For example, there is imposed a control of export. Alternatively, the use of a very special authentication program may be needed. In such a situation, there can be cases in which the use of the certificate of high security strength in all of the apparatuses by writing the certificates into the apparatuses is difficult.

On the other hand, such restriction imposed to the certificates of high security strength may be less strict in the case of the certificates of lower security strength, and these can be used relatively easily for authentication by storing in all of the apparatuses.

In relation to the above, there is a desire to manufacture and sell an apparatus written with the certificate of low security strength in the state that a certificate of high security strength can be stored thereafter according to the use environment.

In the present invention, it is possible to use the foregoing embodiment under such a situation and carry out the authentication by using a certificate of low security in the case the authentication by using the high security has failed. Upon success of this authentication using the certificate of low security strength, it is determined that the failure of authentication at the time of using the certificate of high security strength has been caused by the anomaly of authentication, and the superordinate apparatus 30 acquires the certificate set including the certificate of high security strength. Thereby, the superordinate apparatus 30 transmits this certificate set to the subordinate apparatus 40. By storing the certificate set of high security strength thus transmitted in the subordinate apparatus 40, it becomes possible to store the certificate matching the use environment of the apparatus in the client while maintaining a certain standard of security.

In the embodiments described heretofore, explanation has been made for the case the superordinate apparatus 30 and the subordinate apparatus 40 or the certificate managing apparatus carry out the authentication according to SSL as explained with reference to FIG. 19 or FIG. 21. However, the present embodiment is not limited to such a particular authentication protocol.

For example, the present invention is also applicable to the case of using the TLS (Transport Layer Security) protocol, which is an improvement of the SSL protocol.

Further, in the embodiment described heretofore, explanation has been made with regard to the example of providing the certificate managing apparatus 20 and the superordinate apparatus 30 separately. However, the present invention is not limited to such a specific example, and these may be provided in a unitary apparatus.

In this case, it is possible to provide the components such as CPU, ROM, RAM, and the like, separately in order to realize the function of the certificate managing apparatus. Alternately, it is possible to use the same CPU, ROM and RAM of the superordinate apparatus 30 and configure the same to function also as the certificate managing apparatus 20 by causing to execute suitable software by the CPU.

In such a case, the communication between the certificate managing apparatus 20 and the integrated superordinate apparatus 30 includes the inter-process communication between the process of causing the hardware to function as the certificate managing apparatus 20 and the process of causing the hardware to function as the superordinate apparatus 30.

Further, in the embodiments described heretofore, explanation has been made with regard to the example of the certificate managing apparatus 20 itself creating the root key certificate or the digital certificate. On the other hand, it is also possible that the function of the certificate key creation part 24 or the certificate issuing part 25 in an apparatus different from the certificate managing apparatus 20 such that the certificate managing part acquires the root key or the digital certificate from these apparatuses.

Further, it should be noted that the program of the present invention is a program configuring a computer to function as a communication apparatus such as the superordinate apparatus 30 or the subordinate apparatus 40 having communication means and authenticating the communication partner at the time of communication by using a digital certificate. Thus, by causing a computer to execute such a program, it becomes possible to obtain the various effects explained above.

While such a program can be stored or written in the storage or memory means such as ROM or HDD of the computer forming a part of the computer, it is also possible that the program is supplied in the form recorded on a nonvolatile recording medium (memory) such as SRAM, EEPROM, memory card, and the like. Thereby, the foregoing procedures can be executed by installing the program recorded in the memory to the computer and causing the CPU to execute the program, or by causing the CPU to read out the program and execute the program thus read out.

Further, it is possible to cause the CPU to execute the program by downloading the same from an external apparatus equipped with the recording medium recorded with the program, or from an external apparatus storing the program in the memory means.

As explained heretofore, the communicating apparatus, the communication system, the anomaly detection method or the program therefore according to the present invention enables easy and prompt recognition of anomaly of authentication occurring in the communicating apparatus or communication system in which authentication of the communication partner is made at the time of communication by using a digital certificate.

Thus, by applying the present invention to such a communication system or the communication apparatus constituting such a communication system, it becomes possible to construct a communication system of high security.

Further, the present invention is by no means limited to the embodiments described heretofore, but various variations and modifications may be made without departing from the scope of the invention.

What is claimed is:

1. A communication apparatus that authenticates a communication partner by using a first digital certificate, the apparatus comprising:
    an authentication part configured to authenticate said communication partner by using a common certificate, said common certificate being a digital certificate that excludes identification information of an apparatus;
    an individualized certificate transmission part configured to acquire, in the case said authentication by said authentication part has been made successfully, an individualized certificate and transmit said individualized certificate to said communication partner, said individualized certificate being a digital certificate including identification information of said communication partner;
    the authentication part further configured to determine that a cause of an authentication failure includes an anomaly in the first digital certificate or a failure to store the first digital certificate in the communication partner, and determine that a cause of the authentication failure excludes a failure in a process of communicating with said communication partner or a failure in authentication processing; and
    a certificate request unit including a memory and configured to transmit a request for issue of said individualized certificate, and transmit a machine number, an Internet Protocol (IP) address, and a Media Access Control (MAC) address of said communication partner based on the determination of the authentication part,
    wherein said authentication part carries out said authentication when communicating with said communication partner first by using said first digital certificate including an individualized certificate, and said authentication part is further configured to carry out an authentication by using said common certificate when said authentication of said communication partner using said individualized certificate has failed.

2. The communication apparatus as claimed in claim 1, wherein said communication apparatus carries out, when communicating with said communication partner, authentication of said communication partner by using the first digital certificate including an initial individualized certificate, and wherein said authentication part is used when said authentication using said initial individualized certificate has been failed.

3. The communication apparatus as claimed in claim 1, wherein said authentication is carried out according to any of an SSL protocol or a TLS protocol, said individualized certificate being a public key certificate of an apparatus identified by said identification information.

4. A communication apparatus configured to communicate with a communication partner apparatus, said communication partner apparatus comprising:
- an authentication part configured to authenticate said communication apparatus as a communication partner by using a common certificate, determine that a cause of an authentication failure includes an anomaly in a first digital certificate or a failure to store the first digital certificate in the communication apparatus, and determine that a cause of the authentication failure excludes a failure in a process of communicating with said communication apparatus or a failure in authentication processing, said common certificate being a digital certificate that excludes identification information of an apparatus;
- an individualized certificate transmission part configured to acquire, in the case said authentication by said authentication part has been made successfully, an individualized certificate and transmit said individualized certificate to said communication apparatus, said individualized certificate being a digital certificate including identification information of said communication apparatus; and
- a certificate request unit including a memory and configured to transmit a request for issue of said individualized certificate, and to transmit a machine number, an Internet Protocol (IP) address, and a Media Access Control (MAC) address of said communication apparatus based on the determination of the authentication part, said communication apparatus comprising:
  - a certificate storage part configured to store said first digital certificate, said individualized certificate and said common certificate; and
  - a reception part configured to receive said individualized certificate including the machine number as own identification information from said communication partner apparatus and storing said received individualized information in said certificate storage part, wherein said authentication part carries out said authentication when communicating with said communication partner first by using said first digital certificate including an individualized certificate, and said authentication part is further configured to carry out an authentication by using said common certificate when the authentication of said communication partner using said individualized certificate has failed.

5. The communication apparatus as claimed in claim 4, wherein said authentication is carried out according to any of an SSL protocol or a TLS protocol, said individualized certificate being a public key certificate of said communication apparatus as identified by said identification information.

6. A communication system comprising:
a superordinate apparatus and a subordinate apparatus,
said subordinate apparatus including a certificate storage part configured to store a first digital certificate including an individualized certificate and a common certificate, said individualized certificate being a digital certificate including identification information of said subordinate apparatus, said common certificate being a digital certificate that excludes identification information of an apparatus,
said superordinate apparatus including:
- an authentication part configured to authenticate said subordinate apparatus by using said common certificate, determine that a cause of an authentication failure includes an anomaly in the first digital certificate or a failure to store the first digital certificate in the subordinate apparatus, and determine that a cause of the authentication failure excludes a failure in a process of communicating with said subordinate apparatus or a failure in authentication processing;
- an individualized certificate transmission part configured to acquire a new individualized certificate of said subordinate apparatus when said authentication by said authentication part is carried out successfully and transmit said new individualized certificate to said subordinate apparatus; and
- a certificate request unit configured to transmit a request for issue of said new individualized certificate, and transmit a machine number, an Internet Protocol (IP) address, and a Media Access Control (MAC) address of said subordinate apparatus the determination of the authentication part, wherein said superordinate apparatus carries out said authentication when communicating with said subordinate apparatus first by using said first digital certificate including an individualized certificate, said authentication part carrying out said authentication by using said common certificate when said authentication of said subordinate apparatus using said initial individualized certificate has failed.

7. The communication system as claimed in claim 6, wherein said common certificate is used exclusively when storing a new individualized certificate acquired by said individualized certificate transmission part to said subordinate apparatus.

8. The communication system as claimed in claim 6, wherein said subordinate apparatus is provided in plural numbers, and wherein said common certificate is stored commonly to said certificate storage part of all of said plural subordinate apparatuses.

9. The communication system as claimed in claim 6, wherein said authentication is carried out by an authentication processing according to any of an SSL protocol and a TLS protocol, and wherein said individualized certificate is a public key certificate of said subordinate apparatus.

10. A certificate transmission method of transmitting a first digital certificate used for authentication in a communication apparatus, said communication apparatus authenticating a communication partner at the time of communication by using said first digital certificate, said certificate transmission method comprising:
- authenticating said communication partner by using a common certificate, which is a digital certificate that excludes identification information of an apparatus;
- acquiring, when said authenticating has been made successfully, an individualized certificate, which is a digital certificate including identification information of said communication partner;
- transmitting said individualized certificate to said communication partner;
- determining that a cause of an authentication failure includes an anomaly in the first digital certificate or a failure to store the first digital certificate in the communication partner;
- determining that a cause of the authentication failure excludes a failure in a process of communicating with said communication partner or a failure in authentication processing;
- transmitting a request for issue of said individualized certificate and transmitting a machine number, an Internet Protocol (IP) address, and a Media Access Control (MAC) address of said communication partner, wherein authentication of said communication partner is carried out first by using said first digital certificate including an initial individualized certificate when communicating with said communication partner and said authentication by using said common certificate is carried out in the case said authentication by using said initial individualized certificate has failed.

11. The certificate transmission method as claimed in claim 10, wherein said authentication is carried out by an authentication processing according to any of an SSL protocol and a TLS protocol, said individualized certificate being a public key certificate of a communication apparatus indicated by said identification information.

12. A certificate transmission method of transmitting a first digital certificate in a communication system formed of a superordinate apparatus and a subordinate apparatus, said superordinate apparatus authenticating said subordinate apparatus at the time of communication by using said first digital certificate, said method comprising:

storing, in said subordinate apparatus, said first digital certificate including an individualized certificate, which is a digital certificate including identification information of said subordinate apparatus and a common certificate that excludes identification information of an apparatus;

causing said superordinate apparatus to authenticate said subordinate apparatus by using a common certificate;

acquiring a new individualized certificate of said subordinate apparatus when authentication of said subordinate apparatus by said superordinate apparatus has been made successfully;

transmitting said new individualized certificate to said subordinate apparatus;

determining that a cause of an authentication failure includes an anomaly in the first digital certificate or a failure to store the first digital certificate in the subordinate apparatus;

determining that a cause of the authentication failure excludes a failure in a process of communicating with said subordinate apparatus or a failure in authentication processing;

transmitting a request for issue of said new individualized certificate and transmitting a machine number, an Internet Protocol (IP) address, and a Media Access Control (MAC) address of said subordinate apparatus, wherein said superordinate apparatus carries out, when communicating with said subordinate apparatus, authentication of said subordinate apparatus by using said first digital certificate including an initial individualized certificate, said superordinate apparatus carrying out said authentication using said common certificate in the event said authentication has failed.

13. The certificate transmission method as claimed in claim 12, wherein said common certificate is a certificate used exclusively when storing said new individualized certificate in said subordinate apparatus.

14. The certificate transmission method as claimed in claim 12, wherein said subordinate apparatus is provided in plural numbers, and wherein said common certificate is stored commonly in a certificate memory part of all of said plural subordinate apparatuses.

15. The certificate transmission method as claimed in claim 12, wherein said authentication is carried out by an authentication processing according to any of an SSL protocol or a TLS protocol, and wherein said individualized certificate is a public key certificate of said subordinate apparatus.

16. A recording medium storing a program code that when executed by a computer causes the computer to function as a communication apparatus authenticating a communication partner at the time of communication by using a first digital certificate, comprising:

authenticating said communication partner by using a common certificate, which is a digital certificate that excludes identification information of an apparatus;

acquiring, in the case authentication by said authenticating has been made successfully, an individualized certificate, which is a digital certificate including identification information of said communication partner, and transmitting said individualized certificate to said communication partner;

determining that a cause of an authentication failure includes an anomaly in the first digital certificate or a failure to store the first digital certificate in the communication partner;

determining that a cause of the authentication failure excludes a failure in a process of communicating with said communication partner or a failure in authentication processing;

transmitting a request for issue of said individualized certificate and transmitting a machine number, an Internet Protocol (IP) address, and a Media Access Control (MAC) address of said communication partner; and carrying out authentication by using the first digital certificate including an initial individualized certificate at first when communicating with a communication partner, wherein authenticating carries out said authentication by using said common certificate, in the case authentication by using said initial individualized certificate has failed.

17. The medium as claimed in claim 16 wherein said authentication is carried out by an authentication processing according to any of an SSL protocol and a TLS protocol, and wherein said individualized certificate is a public key certificate of said apparatus indicated by said identification information.

18. A recording medium storing program code that when executed by a computer causes the computer to function as a communication apparatus communicating with a communication partner apparatus, said communication partner apparatus comprising: an authentication part configured to authenticate said communication apparatus as a communication partner by using a common certificate, determine that a cause of an authentication failure includes an anomaly in a first digital certificate or a failure to store the first digital certificate in the communication apparatus, and determine that a cause of the authentication failure excludes a failure in a process of communicating with said communication apparatus or a failure in authentication processing, said common certificate being a digital certificate that excludes identification information of an apparatus; and an individualized certificate transmission part configured to acquire, in the case said authentication by said authentication part has been made successfully, an individualized certificate and transmit said individualized certificate to said communication apparatus, said individualized certificate being a digital certificate including identification information of said communication apparatus; and a certificate request unit configured to transmit a request for issue of said individualized certificate, and to transmit a machine number, an Internet Protocol (IP) address, and a Media Access Control (MAC) address of said communication apparatus based on the determination of the authentication part, said program code in said recording medium causing said computer to perform steps comprising:

storing said first digital certificate, said individualized certificate and said common certificate; and receiving said individualized certificate including the machine number as said identification information of own communication apparatus from said communication partner apparatus, wherein said authentication part carries out said authentication when communicating with said communication partner first by using said first digital certificate including an individualized certificate, and said authentication part is further configured to carry out an authentication by using said common certificate when an authentication of said communication partner using said individualized certificate has failed.

* * * * *